(12) United States Patent
Hazama et al.

(10) Patent No.: US 6,226,456 B1
(45) Date of Patent: *May 1, 2001

(54) LENS-FITTED FILM UNIT WITH BUILT-IN STROBE

(75) Inventors: Kiyoaki Hazama; Katsuyuki Koizumi; Masaru Yamazaki; Hiroshi Yamaguchi; Kyoichi Itoh, all of Hino (JP)

(73) Assignee: Konica Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,828

(22) Filed: Mar. 9, 1998

(30) Foreign Application Priority Data

| Mar. 12, 1997 | (JP) | 9-057738 |
|---|---|---|
| Mar. 12, 1997 | (JP) | 9-057740 |
| Mar. 12, 1997 | (JP) | 9-057741 |

(51) Int. Cl.$^7$ ............................ G03B 17/02; G03B 15/03
(52) U.S. Cl. ...................................... 396/6; 396/178
(58) Field of Search ............................ 396/6, 176, 177, 396/178, 348, 349, 350, 535, 538, 440

(56) References Cited

U.S. PATENT DOCUMENTS

| 4,945,368 | | 7/1990 | Ishino et al. | |
|---|---|---|---|---|
| 4,965,615 | * | 10/1990 | Fujita et al. | 396/176 |
| 5,019,845 | * | 5/1991 | Asakura et al. | 396/175 |
| 5,066,967 | * | 11/1991 | Yamamoto et al. | 396/177 |
| 5,245,374 | * | 9/1993 | Hosokawa et al. | 396/177 |
| 5,270,757 | * | 12/1993 | Tosaka et al. | 396/177 |
| 5,287,135 | * | 2/1994 | Arai et al. | 396/174 |
| 5,357,299 | * | 10/1994 | Cheeseman | 396/144 |
| 5,438,380 | * | 8/1995 | Muramatsu | 396/316 |
| 5,521,670 | * | 5/1996 | Hara et al. | 396/542 |
| 5,708,877 | * | 1/1998 | Pankhurst | 396/178 |
| 5,721,984 | * | 2/1998 | Kaneko et al. | 396/177 |
| 5,745,815 | * | 4/1998 | Aoki | 396/177 |
| 5,749,003 | * | 5/1998 | Tanabe | 396/177 |
| 5,754,910 | * | 5/1998 | Balling | 396/536 |
| 5,854,946 | * | 12/1998 | Motomura et al. | 396/6 |
| 5,884,112 | * | 3/1999 | Funahashi et al. | 396/539 |

FOREIGN PATENT DOCUMENTS

| 8-62675 | 3/1996 | (JP) . |
|---|---|---|
| 8-122978 | 5/1996 | (JP) . |

OTHER PUBLICATIONS

Patent Abstracts of Japan, vol. 096, No. 007, Jul. 31, 1996, and JP 08–062675 A (Fuji Photo Film Co. Ltd.), Mar. 8, 1996, – Abstract.

Patent Abstracts of Japan, vol. 096, No. 009, Sep. 30, 1996, and JP 08–122978 A (Fuji Photo Film Co., Ltd.), May 17, 1996, – Abstract.

\* cited by examiner

*Primary Examiner*—David M. Gray
(74) *Attorney, Agent, or Firm*—Frishauf, Holtz, Goodman, Langer & Chick, P.C.

(57) ABSTRACT

In a lens-fitted film unit with a built-in strobe, when photographing is conducted with strobe light, a strobe unit takes a first attitude in which a strobe panel is directed to a subject being photographed, while when photographing is conducted without the strobe light or when photographing is not conducted, the strobe unit takes a second attitude in which the strobe panel is directed almost downward, a strobe frame is rotated so as to change from the first attitude to the second attitude or from the second attitude to the first attitude, a portion or an entire portion of a print base board is located beneath the strobe panel when the strobe unit takes the second attitude, a front cover has a protruded first wall section to hide at least the portion of the print base board located beneath the strobe panel when the strobe unit takes the second attitude.

7 Claims, 16 Drawing Sheets

LENS-FITTED FILM UNIT WITH BUILT-IN STROBE

BACKGROUND OF THE INVENTION

The present invention relates to a lens-fitted film unit with a built-in strobe in which a strobe light emitting frame is rotated so as to change its attitude for photographing with the strobe light or for photographing without the strobe light.

Hitherto, a lens-fitted film unit with a built-in strobe light is on the market. Recently, the competition to reduce the size of the film unit has become more severe between manufacturers. However, the risk of red eye phenomenon caused by the small size of the film unit is increased accordingly.

In the red eye phenomenon, the strobe light passes the pupil of a subject being photographed and reflects on the retina, whereby the pupil is photographed as red due to the red color of the capillaries on the retina. The smaller the angle formed by the line connecting the center of the strobe light with the subject and the line connecting the optical axis of the photographing lens with the subject, the more frequently the red eye phenomenon occurs. The frequency of occurrence of the red eye phenomenon differs greatly depending on an individual or a human race. In the case of the same person, the frequency of occurrence of the red eye phenomenon differs greatly depends on the direction of the eye and the degree of opening of the pupil. However, if the photographing lens, the photographing distance and the subject are assumed on the same conditions, the smaller the distance between the center of the strobe light and the optical axis of the photographing lens, the more frequent the red eye phenomenon takes place.

Therefore, in the excessively small-sized lens-fitted film unit, it may be difficult to avoid the risk of the above-described red eye phenomenon with a strobe light emitting frame merely fixed at the corner of the lens unit.

In order to reduce the red eye phenomenon, Tokukaihei 8-62675 (Japanese Unexamined Patent Publication) discloses the construction that the light emitting frame is slid into the right direction with the view from the front side during photographing with the strobe so that the distance between the center of the strobe light and the optical axis of the photographing lens is expanded.

Also, Tokukaihei 8-122978 discloses the construction that the light emitting frame is made integrally with a part of the back cover and is rotated by 90 degrees by bending the part of the back cover so that the distance between the center of the strobe light and the optical axis of the photographing lens is expanded.

Incidentally, in the lens-fitted film unit, even if photographing with a strobe is conducted for all frames of roll film, photographing with the strobe enough to conduct for 24 or 27 frames may be permissible. Accordingly, the lens-fitted film unit is different from an ordinary camera in that the user can not replace the battery with a spare one. As the operating section on the strobe switch of a conventional lens-fitted film unit, there are a type in which the main switch is turned on by an operating button which is pushed from the front side while the strobe unit is charged, or another type in which the main switch is turned on by the operating lever which is slid transversely so that its tip end is protruded transversely. However, in the type in which the operating button is pushed from the front side, the operating button may be pushed continuously unintentionally while in a bag. On the other hand, in another type of film unit in which the operating lever is slid transversely, the user may forget to return the operating lever to the original position so that the main switch is kept on. In either type, if the main switch is kept on for a long time, the power source of the battery is uselessly consumed. As a result, photographing with the strobe will not be able to be conducted. From the above view points, it is preferable to make the light emitting frame movable during photographing with a strobe.

The first objective of the present invention is to solve the following problems in the type of the strobe that the light emitting frame is protruded so as to expand the distance between the center of the strobe light and the optical axis of the photographing lens in order to reduce the red eye phenomenon as disclosed by Tokukaihei 8-62675 and Tokukaihei 8-122978.

When the light emitting frame is protruded, since the inner mechanism and electric parts are observed from the outside, the appearance is not nice and troubles may be caused by such an exposed construction. To counter this problem, when the light emitting frame is rotated so as to protrude in order to conduct the photographing the strobe, the configuration is structured such that the inner mechanism and electric parts are not observed from the outside.

Further, although an operation member is operated when the light emitting frame is protruded, while when the light emitting frame is housed in from the protruded condition, the light emitting frame is constructed so as to be housed in the unit so as to allow it to push down the top surface of the light emitting frame.

The strobe light emitting frame whose attitude is changed for conducting photographing with strobe or for conducting photographing without strobe is provided with a predetermined strength with a simple construction.

Next, problems to be solved by the present invention in the film unit will be explained.

As discussed before, recently, the competition to reduce the size of the film unit has become more severe among manufacturers and the realization of such a smaller size film unit is requested. For this purpose, it may be considered that in the lens-fitted film unit with a built-in strobe, a cylindrical battery is shifted from the side of a scroll room to be placed beneath the lens barrel together with a main condenser. With this arrangement, the length of the lens-fitted film unit in the longitudinal direction may be shortened by the length corresponding to the diameter of the cylindrical battery. However, since a strobe light emitting section is also shifted inwardly, the distance between the optical axis of the light emitting section and the optical axis of the photographing lens becomes smaller so that red eye phenomenon tends to take place.

Although it is necessary to turn on the strobe switch when photographing with the strobe, if the strobe switch is kept on due to forgetfulness during photographing without the strobe, the battery power source is discharged uselessly, resulting in difficulty in conducting photographing with the strobe.

The main condenser of the strobe is relatively large in size among the parts of the lens-fitted film unit and is placed so as to extend outside the strobe circuit base board. Accordingly, when the main condenser is assembled as the strobe unit in the film unit, it may be hit with some portions, causing the problem that the position of the main condenser is deviated from the predetermined position.

As stated above, if a brush-flocked paper is pasted on the photographing opening section in order to avoid inner surface reflection, cost is raised due to expenses for the parts and the fitting. Then, if a throttle is provided on the inner surface of the photographing opening section, the cost raise may be reduced. However, the throttle may not be sufficient for strong reverse light.

Also, as stated above, it may be necessary to prevent the film in an APS type cartridge from being moved by actuation of shutter release in order to avoid poor photograph degradation in terms of sharpness.

In order to prevent environmental pollution and to reduce cost as much as possible by reducing the number of thrown-away parts, it may be necessary to make it possible to reuse parts and to make it easy to change the image of the film unit.

From the above point of views, the second objective of the present invention is to provide the lens-fitted film unit with the following advantages. The film unit can be made smaller and the red eye phenomenon hardly take place regardless of the small size. The forgetfulness to turn the battery power source off can be avoided. The trouble of the main condenser of the strobe unit hardly occur. The inner wall with which the influence of the inner surface reflection under reverse light may be reduced can be realized at low cost. A photograph with high sharpness can be obtained even with the use of the film in the APS type cartridge. The number of thrown-away parts of the film unit can be reduced and the image of the film unit can be changed easily.

SUMMARY OF THE INVENTION

The first object of the present invention is attained by the structure described in each of the following items.

Item 1. In a lens-fitted film unit with a built-in strobe comprising at least a xenon tube to emit strobe light, a reflecting hood to reflect the strobe light toward the subject, a strobe panel to cover the front of the reflecting hood and to transmit the strobe light, and a light emitting frame for holding the xenon tube, the reflecting hood, and the strobe panel, wherein the light emitting frame is rotated so as to take the first attitude on which the strobe panel faces toward the subject when photographing with strobe or the second attitude on which the strobe panel faces downward; a print base board on which strobe-use electric parts are mounted is arranged to be parallel to the strobe panel when the light emitting frame is rotated to the first attitude or to be placed at a position beneath the strobe when the light emitting frame is rotated to the second attitude, and the upper end of the print board is hidden by the first wall protruded from the outer casing member.

Item 2. In a lens-fitted film unit with a built-in strobe comprising at least a xenon tube to emit strobe light, a reflecting hood to reflect the strobe light toward the subject, a strobe panel to cover the front of the reflecting hood and to transmit the strobe light, and a light emitting frame for holding the xenon tube, the reflecting hood, and the strobe panel, wherein the light emitting frame is rotated so as to take the first attitude on which the strobe panel faces toward the subject when photographing with strobe or the second attitude on which the strobe panel faces downward; the light emitting frame is provided with a supporting shaft and a unit body in which photographing means to conduct photographing is mounted is provided with a bearing with which the supporting shaft is fitted, and at least the supporting shaft and the bearing are hidden by the outer casing member.

Item 3. In a lens-fitted film unit with a built-in strobe comprising at least a xenon tube to emit strobe light, a reflecting hood to reflect the strobe light toward the subject, a strobe panel to cover the front of the reflecting hood and to transmit the strobe light, and a light emitting frame for holding the xenon tube, the reflecting hood, and the strobe panel, wherein the light emitting frame is rotated so as to take the first attitude on which the strobe panel faces toward the subject when photographing with strobe or the second attitude on which the strobe panel faces downward; a finger hook to rotate the light emitting frame is provided on the top surface of the light emitting frame.

Item 4. In a lens-fitted film unit with a built-in strobe comprising at least a xenon tube to emit strobe light, a reflecting hood to reflect the strobe light toward the subject, a strobe panel to cover the front of the reflecting hood and to transmit the strobe light, and a light emitting frame for holding the xenon tube, the reflecting hood, and the strobe panel, wherein the light emitting frame is rotated so as to take the first attitude on which the strobe panel faces toward the subject when photographing with strobe or the second attitude on which the strobe panel faces downward; the light emitting frame is provided with a supporting shaft and the unit body in which photographing means for conducting photographing is provided with a bearing with which the supporting shaft is fitted.

Item 5. In a lens-fitted film unit with a built-in strobe comprising at least a xenon tube to emit strobe light, a reflecting hood to reflect the strobe light toward the subject, a strobe panel to cover the front of the reflecting hood and to transmit the strobe light, and a light emitting frame for holding the xenon tube, the reflecting hood, and the strobe panel, wherein the light emitting frame is rotated so as to take the first attitude on which the strobe panel faces toward the subject when photographing with strobe or the second attitude on which the strobe panel faces downward; the light emitting frame is provided with a supporting shaft, wherein the supporting shaft is rotatably held between the unit body in which photographing means for conducting photographing is mounted and a front cover to cover the front of the unit body or between the front cover and a back cover to cover the back of the unit body.

The second object of the present invention is attained by the structure described in each of the following items.

Item 6. In a lens-fitted film unit in which a lens barrel to hold at least a photographing lens is arranged between a cartridge room in which a cartridge is housed and a scroll room in which unexposed film is wound up in advance and stored; a strobe light emitting section capable of changing its attitude for photographing with the strobe or for photographing without the strobe is mounted above the scroll room and a cylindrical battery for the strobe power source and a main condenser for the strobe are arranged in parallel beneath the lens barrel.

Item 7. In a lens-fitted film unit in which an opening section through which film is exposed with photographing light by a photographing lens is arranged between a cartridge room in which a cartridge is housed and a scroll room in which unexposed film is wound up in advance and stored; at least one piece of protruded wall having a surface crossing the optical axis of the photographing lens is provided on at least one inner circumference wall among inner circumference walls in the photographing opening section.

Item 8. In a lens-fitted film unit in which an opening section through which film is exposed with photographing light by a photographing lens is arranged between a cartridge room in which a cartridge is housed and a scroll room in which unexposed APS type film is wound up in advance and stored; first elongated projections are provided in parallel to the film feeding direction on upper and lower portions of the opening section and second elongated projections are provided in parallel to the first elongated projections at the out side of the first elongated projections on an inner wall of an outer casing member arranged opposite to the opening section, wherein the film is put between the first elongated projections and the second elongated projections and is pushed toward the first elongated projections by the second elongated projections.

DETAILED DESCRIPTION OF THE PREFERRED EMBODIMENTS

An embodiment of a lens-fitted film unit with a built-in strobe according to the present invention to attain the first objective will be explained hereinafter with reference to FIGS. 1 to 9.

Figure 1:
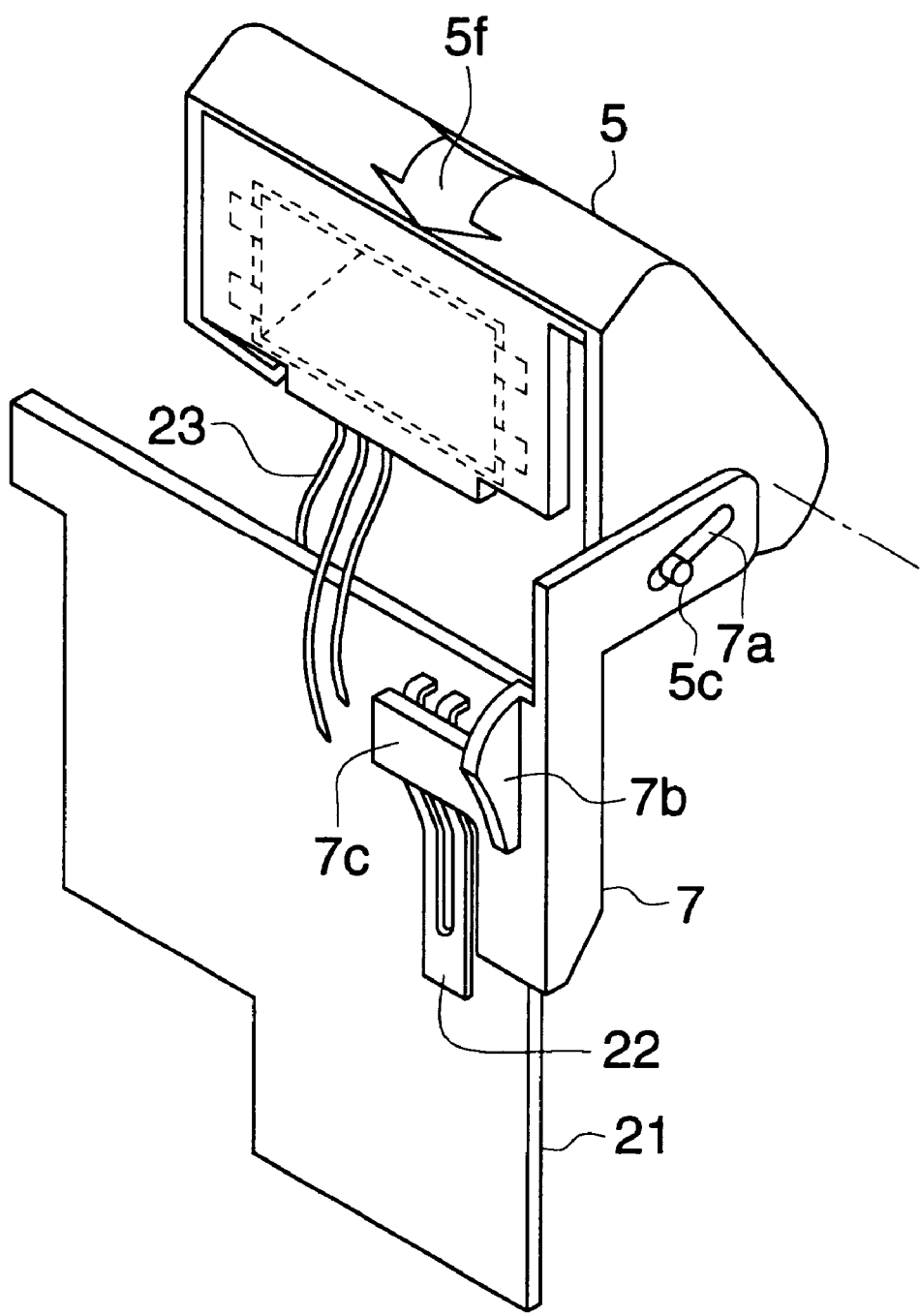
FIG. 1 is a perspective view in which the front of the light emitting frame is observed.
Figure 2:
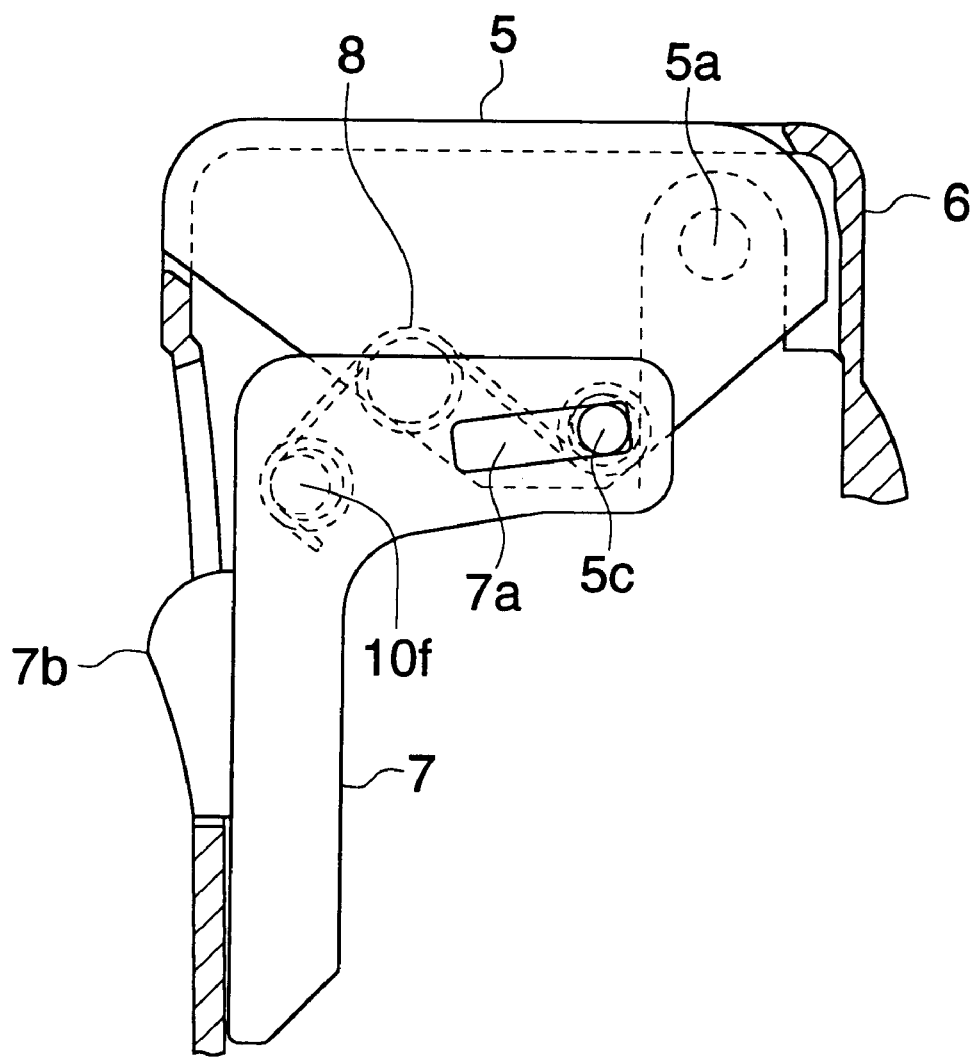
FIG. 2 is a right side view of the light emitting frame in the time of conducting photographing without a strobe.
Figure 3:
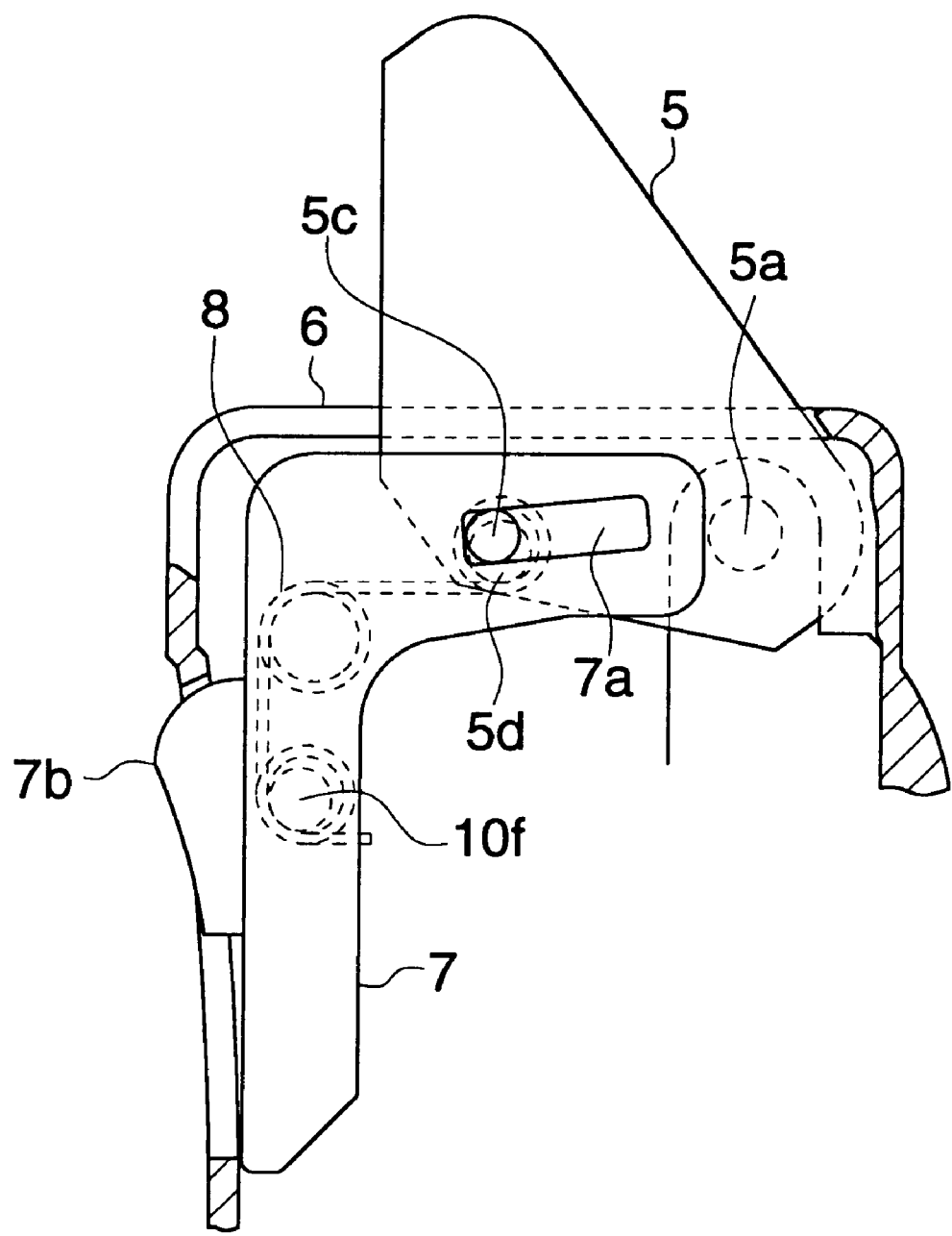
FIG. 3 is a right side view of the light emitting frame in the time of conducting photographing with the strobe.
Figure 4:
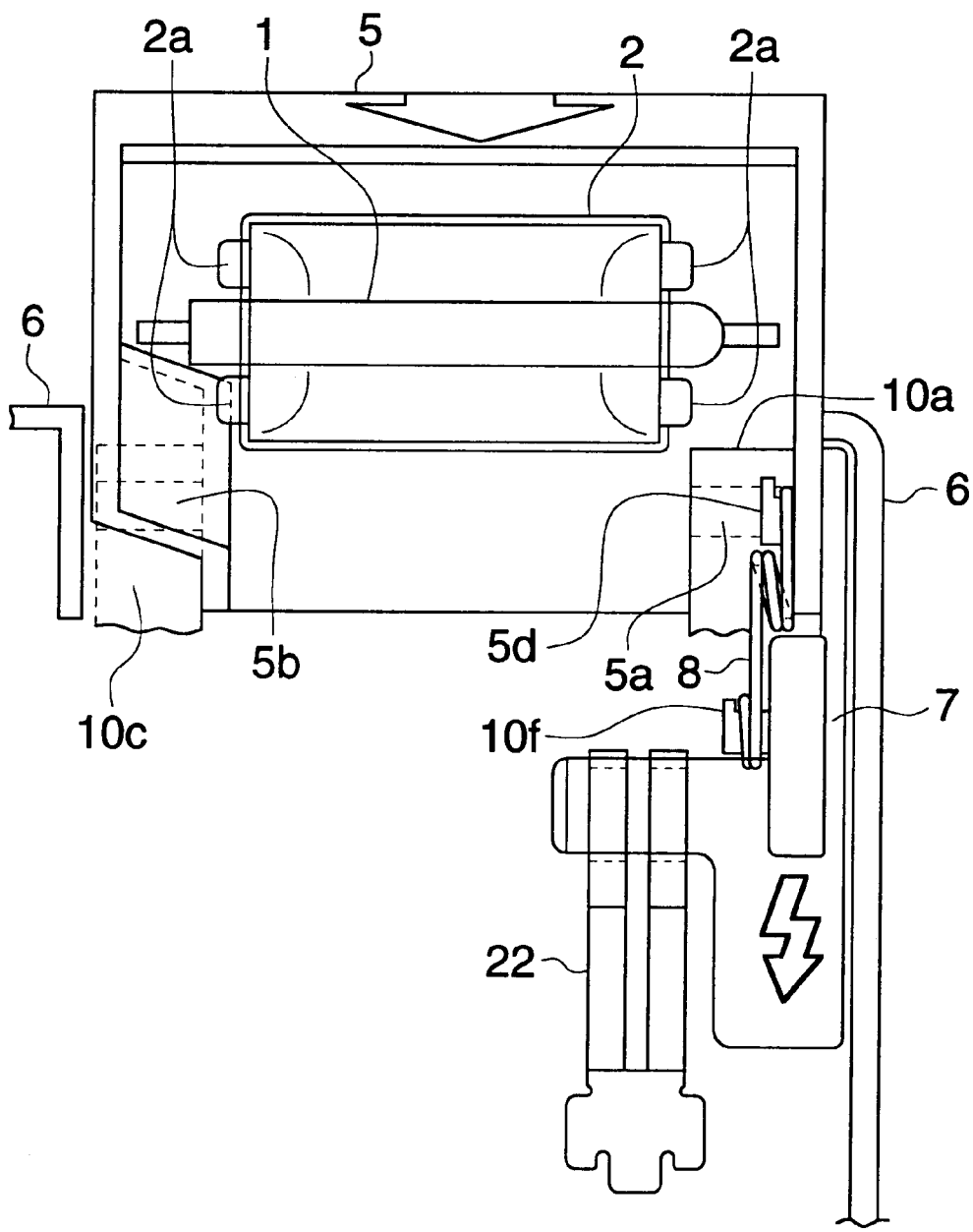
FIG. 4 is a front view of the light emitting frame in the time of conducting photographing with the strobe.
Figure 5:
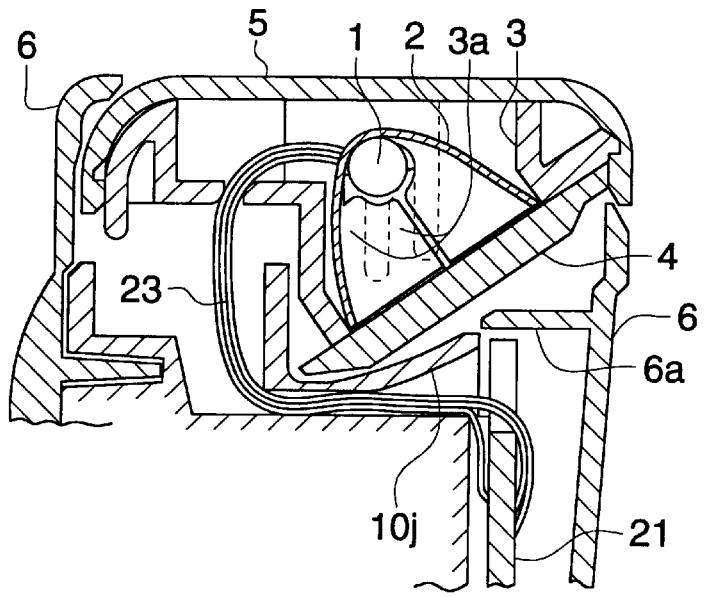
FIG. 5 is a cross sectional view of the light emitting frame in the time of conducting photographing without the strobe.
Figure 6:
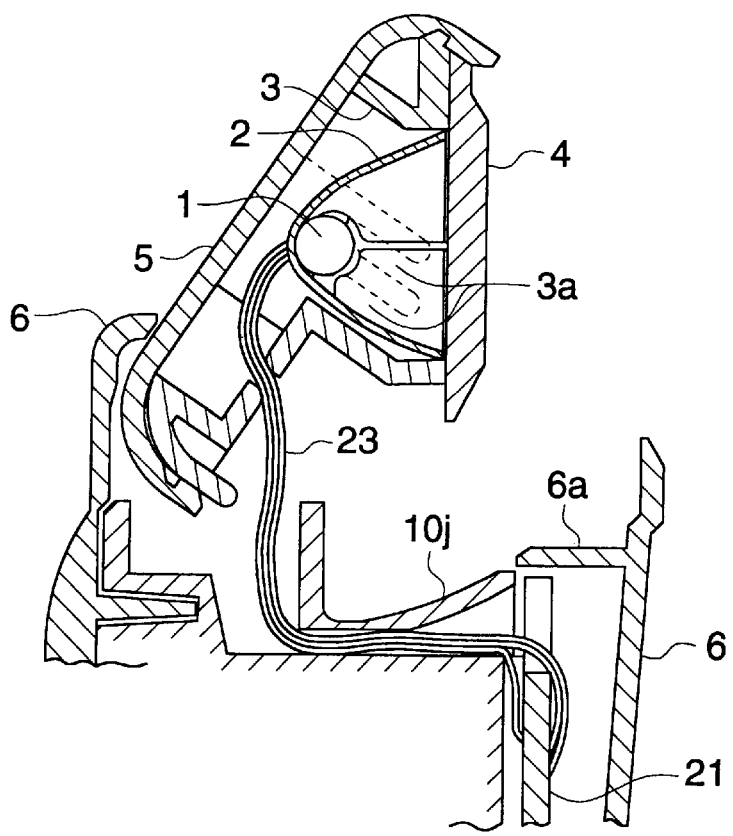
FIG. 6 is a cross sectional view of the light emitting frame in the time of conducting photographing with the strobe.
Figure 7:
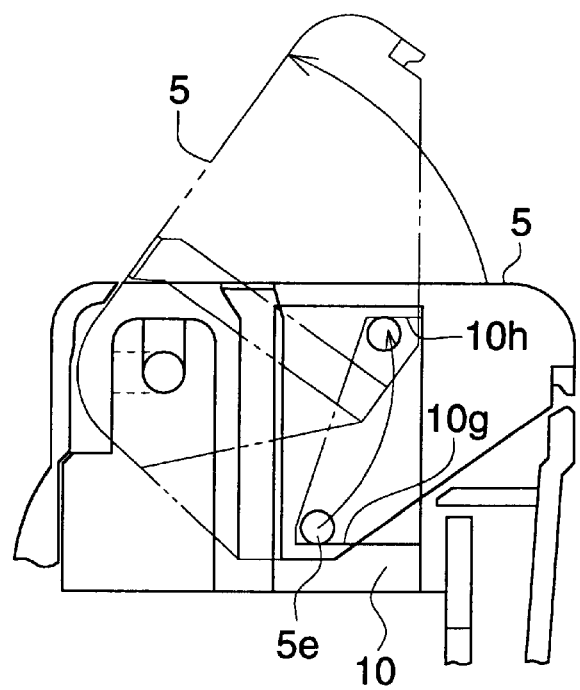
FIG. 7 is a left side view showing a stop position in the time of conducting photographing with the strobe or without the strobe respectively.
Figure 8:
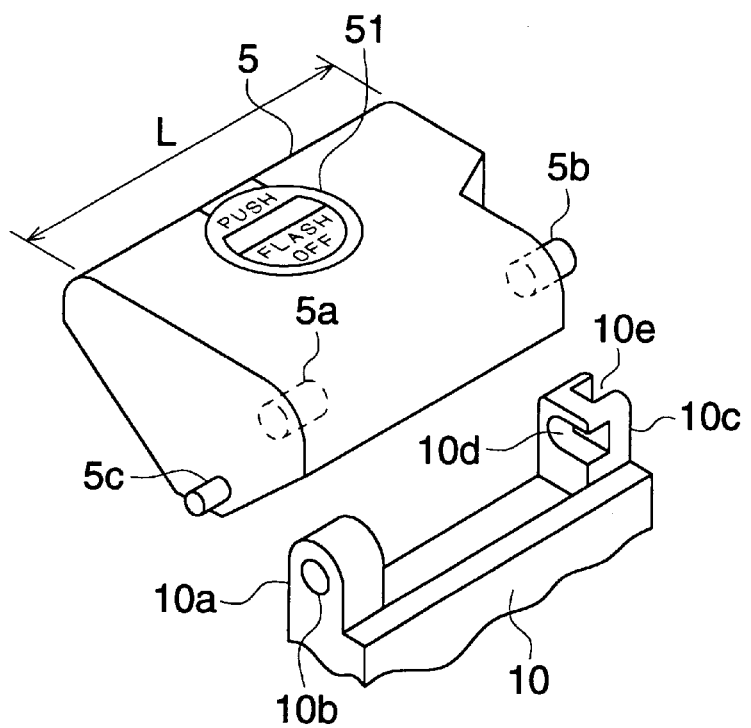
FIG. 8 is a perspective view showing the condition that the light emitting frame is fit in a unit body.
Figure 9:
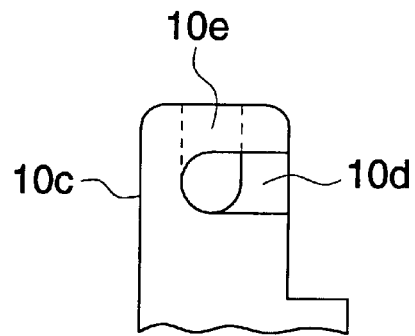
FIG. 9 is an enlarged side view of a bearing in the unit body.

FIG. 1 is a perspective view observing a light emitting frame. FIG. 2 is a right side view of the light emitting frame in the time of conducting photographing without a strobe. FIG. 3 is a right side view of the light emitting frame in the time of conducting photographing with the strobe. FIG. 4 is a front view of the light emitting frame in the time of conducting photographing with the strobe. FIG. 5 is a cross sectional view of the light emitting frame in the time of conducting photographing without the strobe. FIG. 6 is a cross sectional view of the light emitting frame in the time of conducting photographing with the strobe. FIG. 7 is a left side view showing a stop position in the time of conducting photographing with the strobe or without the strobe respectively. FIG. 8 is a perspective view showing the condition that the light emitting frame is fit in a unit body. FIG. 9 is an enlarged side view of a bearing in the unit body.

In FIGS. 4, 5 and 6, a light emitting tube 1 to emit a strobe light is attached to a reflecting hood 2 to reflect the strobe light toward a subject to be photographed. Then, the reflecting hood 2 is attached together with the light emitting tube 1 to a retaining frame 3. The front of the reflecting hood 2 is covered with a strobe panel 4 which is made in transparency or semitransparency in order to transmit the strobe light.

In the above construction, the back of the light emitting tube 1 is brought in close contact with the reflecting hood 2. The reflecting hood 2 is fit in the retaining frame with bent sections 2a provided at four points so that the reflecting hood 2 can not be moved backward (in FIG. 4, the bent sections 2a are shown, however, the retaining frame is omitted). Further, the strobe panel 4 is attached to the retaining frame 3 with attaching claws so that the reflecting hood 2 can not be moved forward. Needless to say, the movement of the reflecting hood 2 to right or left is restricted by the retaining frame 3. Furthermore, since arm sections 3a of the retaining frame 3 are brought in contact with the front of the light emitting tube 1, the position of the light emitting tube 1 is determined in terms of the forward and backward directions.

The retaining frame 3 on which the light emitting tube 1, the reflecting hood 2 and the strobe panel are retained in the above ways is mounted in the light emitting frame 5.

As shown in FIGS. 2 and 5, in the time of conducting photographing without the strobe, the light emitting frame 5 is hidden in a external casing member 6, whereby the light emitting frame 5 is placed so as to take its second attitude in which the strobe panel 4 faces downward. On the other hand, as shown in FIGS. 3 and 6, in the time of conducting photographing with the strobe, the light emitting frame 5 is rotated so as to stand above the external casing member 6, whereby the strobe panel 4 is placed so as to take its first attitude in which the strobe panel 4 faces toward a subject to be photographed. The structure by which the light emitting frame 5 is rotated in the above manner in the time of conducting photographing with the strobe or without strobe will be explained hereinafter.

As shown in FIG. 4, a supporting shaft 5a is protruded from the internal surface of a right side wall of the light emitting frame 5 and a supporting shaft 5b is protruded from the external surface of a left side wall. As shown in FIG. 8 in which a part of the construction is depicted, bearings 10a and 10c are provided on the unit body 10 on which components of photographing means to conduct photographing are mounted. Although the bearing 10a is merely provided with a through hole 10b for fitting, the bearing 10c comprises a first bearing section 10d having a half circle-shaped fitting surface which is opened backward and a second bearing section 10e having a half circle-shaped fitting surface which is opened upward. The enlarged side view of the bearing 10c is shown in FIG. 9. The reason why the bearings are shaped above is originated from the following constructions. A mold for the through hole 10b of the bearing 10a can be pulled out transversely easily due to the mold construction. However, since it may be difficult to do so for the bearing 10c, a mold construction in which the mold is pulled out backward and another mold construction in which the mold is pulled out upwardly are combined for the bearing 10c so that it is not necessary to pull out the molds transversely.

Alternately, it may be possible to combine a mold construction in which the mold is pulled out backward and another mold construction in which the mold is pulled out forward. In other words, it may be permissible to form the mold construction in which the mold can be pulled out by rotating the mold by 90 degrees or 180 degrees.

Incidentally, the construction that the hole of the bearing 10a is made in a non-through hole is not preferable in the case that the length of the supporting shaft 5a is not changed, because the width of the bearing 10 becomes larger so that the space for a lead wire mentioned later becomes smaller.

For the bearings 10a and 10c constructed above, the supporting shafts 5a and 5b may be inserted from the right direction in FIG. 4 and the lower left direction in FIG. 8.

Further, with the construction that the width of the back of the light emitting frame 5 is made smaller so that a length from the outer surface of the side wall on which the supporting shaft 5a is protruded to the tip end of the supporting shaft 5b is made shorter than the width L of the principal portion of the light emitting frame 5, it can be possible to eliminate the influence of the bearing 10c on the arrangement of peripheral structural members.

Next, as shown in FIGS. 1 to 4, a light emitting frame operating member 7 to operate so as to rotate the light emitting frame 5 and a tumbler spring of a coil spring to actuate surely the light emitting frame 5 are incorporated. The light emitting frame operating member 7 has a structure such that it comes in contact with the unit body 10 and is slidable upward or downward, although the structure is not illustrated. When the outer casing member 7 is mounted, finally, the light emitting frame operating member 7 is prevented from being disengaged. Further, since the light emitting frame operating member 7 comes in contact with the external surface of a right side wall of the light emitting frame 5 located in the direction that the supporting shaft 5a and 5b are inserted into the bearings 10a and 10c, the light emitting frame can be prevented from being slipped out in the right direction in FIG. 1.

A rotation pin 5c is provided so as to stand on an outer surface of the right side wall of the light emitting frame 5 and is fitted with an elongated hole 7a of the light emitting frame operating member 7. A spring hooking pin 5d is provided so as to stand on an internal surface of the right side wall of the light emitting frame 5 and one end of the tumbler spring 8 is hooked on the spring hooking pin 5d. Also, a spring hooking section 10f is provided so as to stand on the unit body 10 and the other end of the tumbler spring 8 is hooked on the spring hooking section 10f. The tumbler spring is bent to the maximum extent on the condition at the almost half point between the first attitude on which the light emitting frame 5 is stood above the outer casing member 6 as shown in FIG. 3 and the second attitude on which the light emitting frame 5 is hidden in the outer casing member 6 as shown in FIG. 2. Accordingly, when an operating section 7b of the light emitting frame operating member 7 is pushed upward by a finger on the first attitude shown in FIG. 2, the rotation pin 5c is pushed upward by the elongated hole 7a, whereby the light emitting frame 5 is rotated clockwise around the supporting shafts 5a and 5b. At this time, the tumbler spring 8 accumulates its spring force more by the almost half of the rotating angles. However, when the light emitting frame 5 rotates over than the dead point on the almost half of the rotating angles, the direction of the spring force is reversed so that the light emitting frame 5 is rotated by the spring force of the tumbler spring 8 even if the finger is released from the operating section 7b and is brought automatically so as to take the first attitude.

On the other hand, when the operating section 7b of the light emitting frame operating member 7 is pushed downward by a finger on the condition shown in FIG. 3, the rotation pin 5c is pushed downward by the elongated hole 7a, whereby the light emitting frame 5 is rotated counterclockwise around the supporting shafts 5a and 5b. At this time, the tumbler spring 8 accumulates its spring force more by the almost half of the rotating angles. However, when the light emitting frame 5 rotates over than the dead point on the almost half of the rotating angles, the direction of the spring force is reversed so that the light emitting frame 5 is rotated by the spring force of the tumbler spring 8 even if the finger is released from the operating section 7b and is brought automatically so as to take the second attitude.

Further, a stop pin 5e is provided so as to stand on a left side wall of the light emitting frame 5. When the light emitting frame 5 takes the first attitude, the stop pin 5e comes in contact with the second stop wall 10g of the unit body 10, and when the light emitting frame 5 takes the second attitude, the stop pin 5e comes in contact with the first stop wall 10h of the unit body 10. Therefore, as stated above, although the light emitting frame 5 is urged by the tumbler spring 8 on the first attitude or on the second attitude, the position of the light emitting frame 5 is determined by the second stop wall 10h or the first stop wall 10g acting as the stopper respectively.

Incidentally, in the time of changing the attitude of the light emitting frame 5, as stated above, it may not be necessarily required to operate the operating section 7b of the light emitting frame operating member upward or downward 7 by a finger. That is, in the time of protruding the light emitting frame 5 from the second attitude to the first attitude, it may be allow to raise the front upper section of the light emitting frame 5 by a finger. On the other hand, in the time of retracting the light emitting frame 5 from the first attitude to the second attitude, it may be allow to push the upper section of the light emitting frame 5 down directly by a finger. Accordingly, the operating section 7b of the light emitting frame operating member 7 is not necessarily needed.

Especially, as shown in FIGS. 1 and 8, if a indicating section 5f composed of letters and figures in the form of concave or convex is formed on the upper section of the light emitting frame 5, the indicating section 5f can be used as a finger hook so that the attitude of the light emitting frame 5 can be surely changed without causing the finger to slip out from it. Incidentally, as the indicating section 5f, either one of letters, symbols, figures and patters or a combination of two of them or more may be used. In FIGS. 1, 5 and 6, on a section position below the light emitting frame 5 is provided a print board 21 on which electric components such as an oscillating circuit of the strobe, a charging circuit, and a light emitting circuit are mounted, though the electric components are not depicted in the figures. On the print board 21 is provided a main switch 22 which is made of an elastic metal plate. When the light emitting frame operating member 7 is operated so as to shift upward so that the light emitting frame 5 is rotated to the first attitude, the main switch 22 is turned ON by an arm section 7c. On the other hand, when the light emitting frame operating member 7 is operated so as to shift downward so that the light emitting frame 5 is rotated to the second attitude, the main switch 22 is turned OFF by the arm section 7c.

Incidentally, in the embodiments shown in FIGS. 1, 5 and 6, when the light emitting unit takes the second attitude in which the strobe panel is directed almost downward, the entire configuration of the print base board 21 is located beneath the strobe panel, and when the light emitting unit takes the first attitude in which the strobe panel is directed toward the subject being photographed, the print base board 21 is arranged in parallel to the strobe panel. However, the arrangement of the print base board 21 is not necessarily limited to the above embodiments.

More concretely, in the case that the print base board is made very thin, when the light emitting unit takes the second attitude, the entire configuration of the print base board is located beneath the strobe panel, and when the light emitting unit takes the first attitude, the print base board is arranged vertical or diagonal to the strobe panel. In the case base board may be arranged beneath the strobe panel when the light emitting unit takes the second attitude.

On the above arrangement of the print base board, the first wall section protruded from the front cover is provided at the position beneath the strobe panel when the light emitting unit takes the second attitude, whereby inner structural parts and electrical parts can be hidden from the outside, and dust and rubbish can be prevented from entering inside the film unit even when the light emitting frame is protruded in the time of photographing, that is, when the light emitting unit takes the first attitude. As a result, troubles caused by the dust and the rubbish can be avoided.

Further, the front cover may be made such that the entire front surface of the film unit can be covered with a single cover member or with several divided cover members. Also, the front cover may be made such that it cover a part of the front surface of the film unit. In the case that the entire front surface of the film unit can be covered with several divided cover members, or in the case that only a part of the front surface of the film unit is covered with a cover member, the front cover provided with the first cover section is a front cover to cover at least the front surface located beneath the strobe unit.

Further, onto the print board 21 are connected three lead wires 23 composed of lead wires from an anode and a cathode of the light emitting tube 1 and a trigger lead wire from the reflecting hood 2.

The rotation pin 5c and the stop pin 5e of the light emitting frame 5, the bearing 10a and 10c, and the light emitting frame operating member 7 are always hidden by the outer casing member 6. Even when the light emitting frame 5 is rotated to the first attitude, the above internal structural members are hidden by the outer casing member 6.

As shown in FIGS. 5 and 6, the upper end portion of the print board 21 is hidden by a first wall section 6a which is protruded from the outer casing member 6. In addition, in the vicinity of the locus drawn by the rotation of the strobe panel 4 is provided a circular arc-shaped second wall section 10j formed by the unit body 10 so as to hide the upper end portion of the print board 21. In this construction, since the tip end of the first wall section 6a and the tip end of the second wall section 10j are positioned close to each other, the print board 21 may be not observed from the outside easily.

In contrast to the construction in FIG. 7, the following construction may be applicable. A stop pin is provided to stand on the unit body 10, an elongated hole is provided on the light emitting frame 5 and the stop pin is fit into the elongated hole so that the end of the elongated hole is used as a stopper.

Also the following construction may be applicable. The light emitting frame is formed by resin. In such a resin construction, both supporting shafts are protruded from inner surfaces of both side walls and are fit into the bearings respectively by elastically deforming the both side wall outward. Alternately, in such a resin construction, both supporting shafts are protruded from outer surfaces of both side walls and are fit into the bearings respectively by elastically deforming the both side wall inward.

Figure 10:
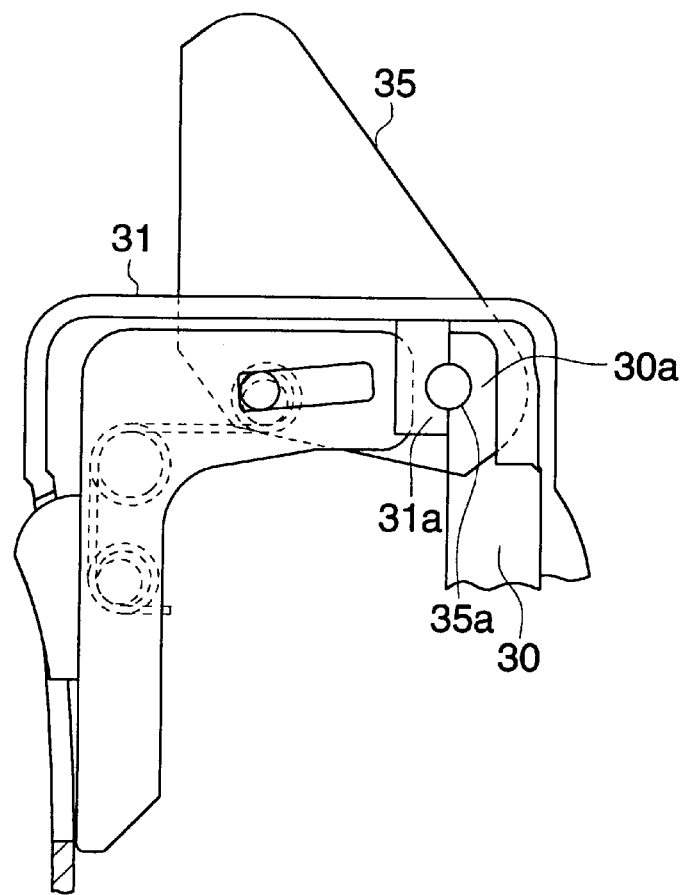
FIG. 10 is a cross sectional view showing another embodiment of the bearing section.

As another embodiment, as shown in FIG. 10, a bearing section 31a having a half circle-shaped fitting surface is provided to a front cover 31 and a bearing section 30a having also a half circle-shaped fitting surface is provided to a unit body 30. Whereby a supporting shaft 35a of a light emitting frame 35 is rotatably sandwiched between the bearing section 31a and the bearing section 30a.

Figure 11:
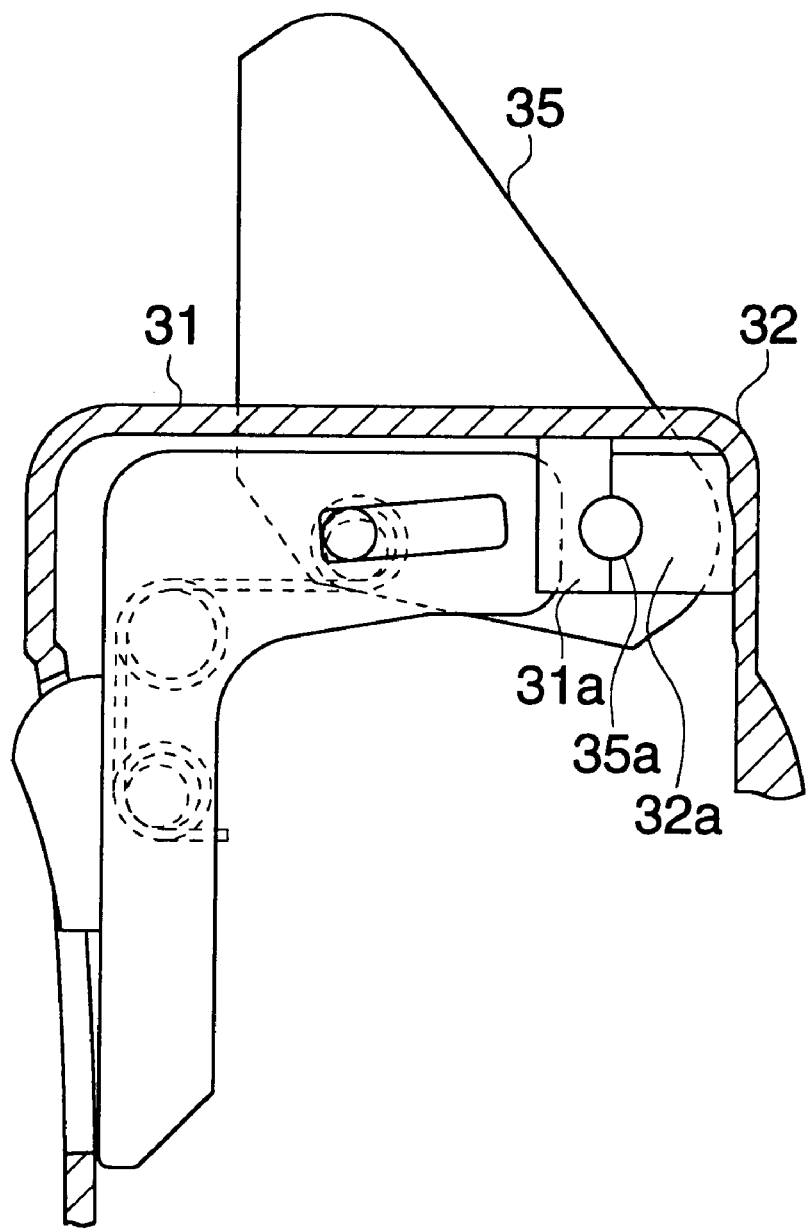
FIG. 11 is a cross sectional view showing another embodiment of the bearing section.

As another embodiment, as shown in FIG. 11, a bearing section 31a having a half circle-shaped fitting surface is provided to a front cover 31 and a bearing section 32a having also a half circle-shaped fitting surface is provided to a rear cover 32. Whereby a supporting shaft 35a of a light emitting frame 35 is rotatably sandwiched between the bearing section 31a and the bearing section 32a.

With the lens-fitted film unit having the structure described in Items 1 to 2, when the light emitting frame is protruded in order to conduct the photographing the strobe, the inner mechanism and electric parts are hardly observed from the outside. As a result, the trouble hardly take place.

With the lens-fitted film unit having the structure described in Items 3, when the light emitting frame is rotated from the protruded condition to the housed condition, since a finger hook is provided on the top portion of the light emitting frame so as to push down the top portion, it may be easy to push it without the slippage of the finger. Also, when the light emitting frame is rotated from the housed condition to the protruded condition, the light emitting frame is easily raised up by hooking a finger on the upper front portion of the light emitting frame.

Figure 20:
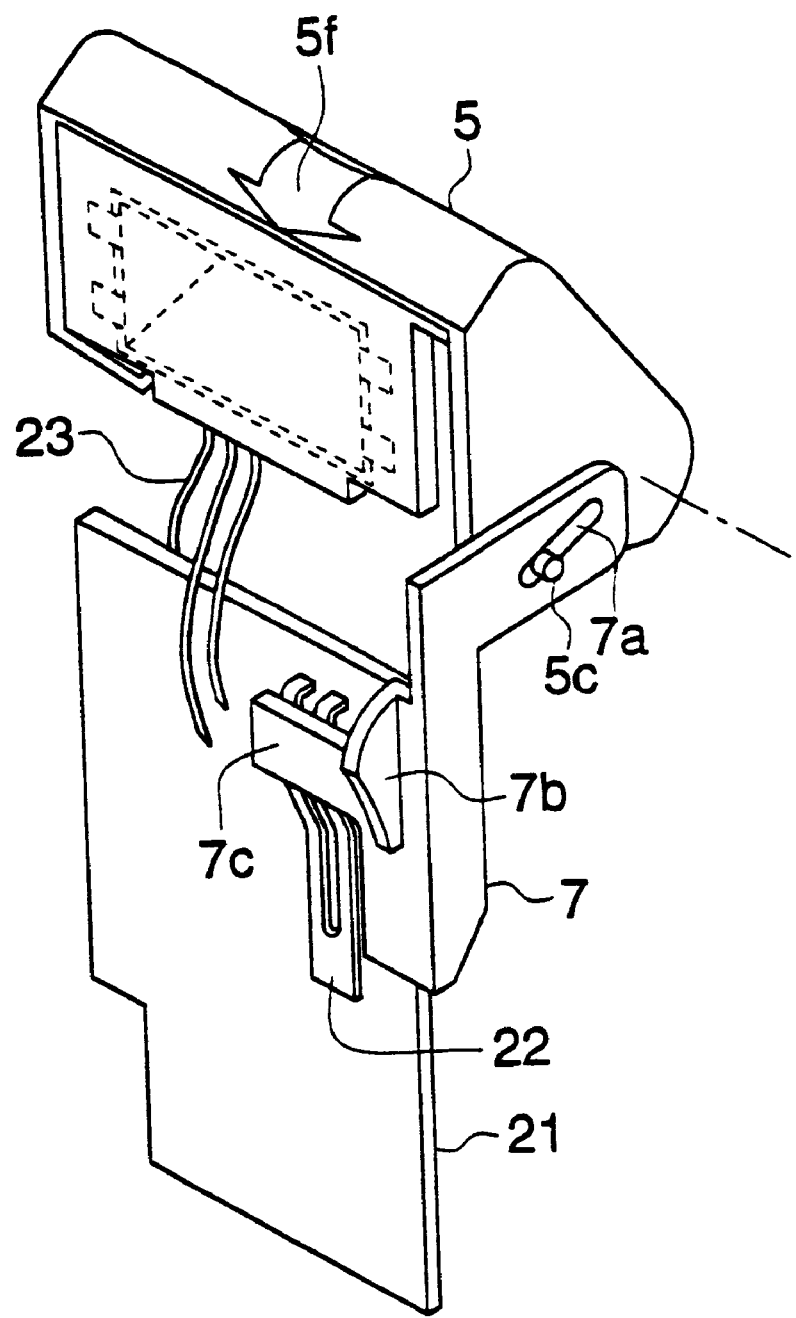
FIG. 20 is a perspective view showing the front of the light emitting frame.
Figure 21:
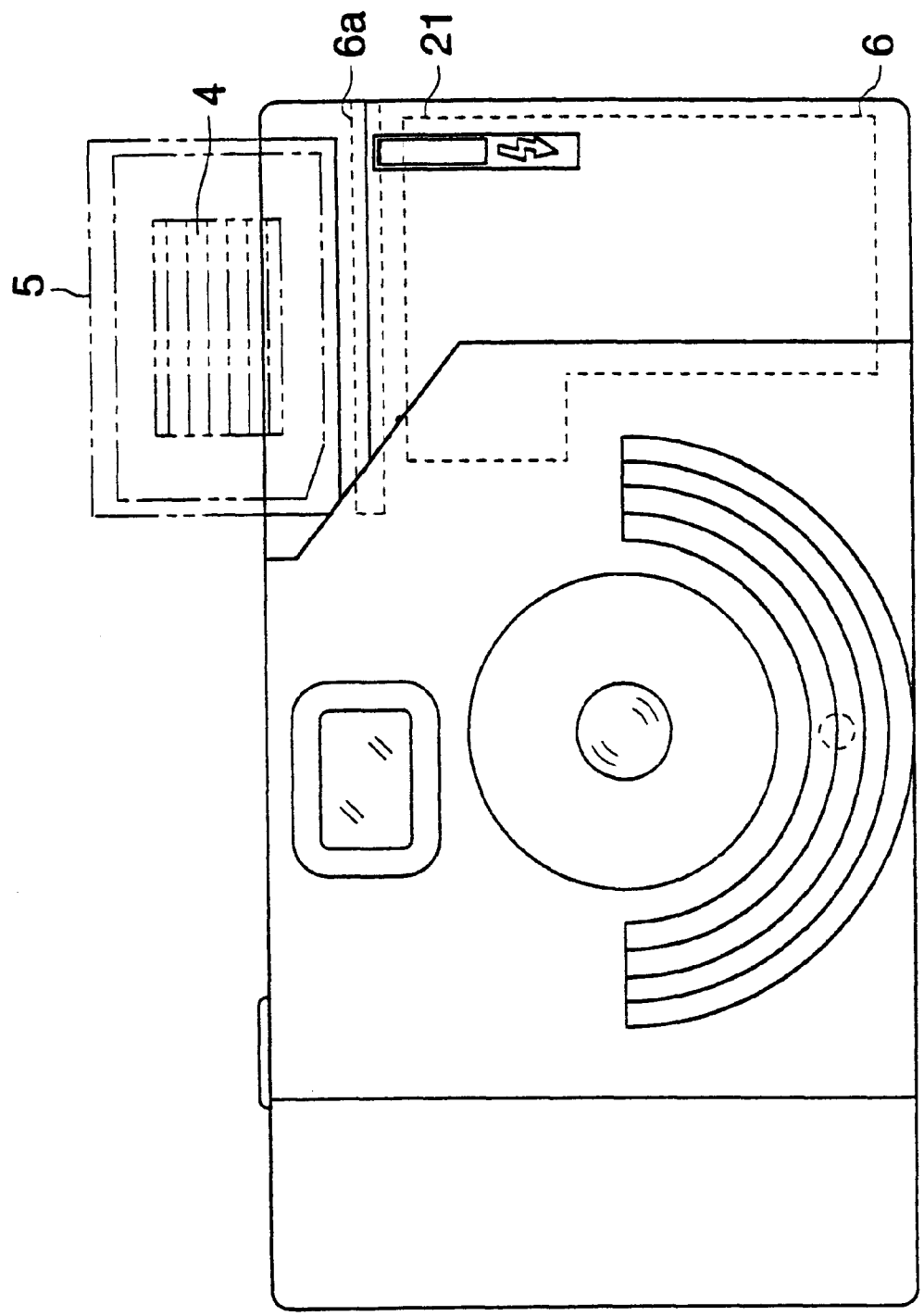
FIG. 21 is a front view showing the lens-fitted film unit according to the present invention.

Incidentally, FIG. 20 is a perspective view showing that the entire portion of the circuit board is located beneath the strobe panel when the strobe is manipulated to take the second attitude. FIG. 21 is a front view showing the dimensional relationship among the protruded first wall 6a, the printed base board 21 and the strobe panel 4 in the lens-fitted film unit.

According to the lens-fitted film unit with a built-in strobe cited in Items 4 to 5, the light emitting frame is surely protruded with the simple structure in the time of photographing. As a result, even the film unit is made in a more small size, since a distance between optical axis of the photographing lens and the strobe is made longer sufficiently, the occurrence of red eyes may be reduced. Since the photographing condition with the strobe can be found at a glance, an event in which the power source switch is kept ON by carelessness may be avoided, whereby a problem that the electric power of a battery is unintentionally consumed can be greatly reduced.

An embodiment of a lens-fitted film unit according to the present invention to attain the second objective will be explained with reference to FIGS. 12–19.

Figure 12:
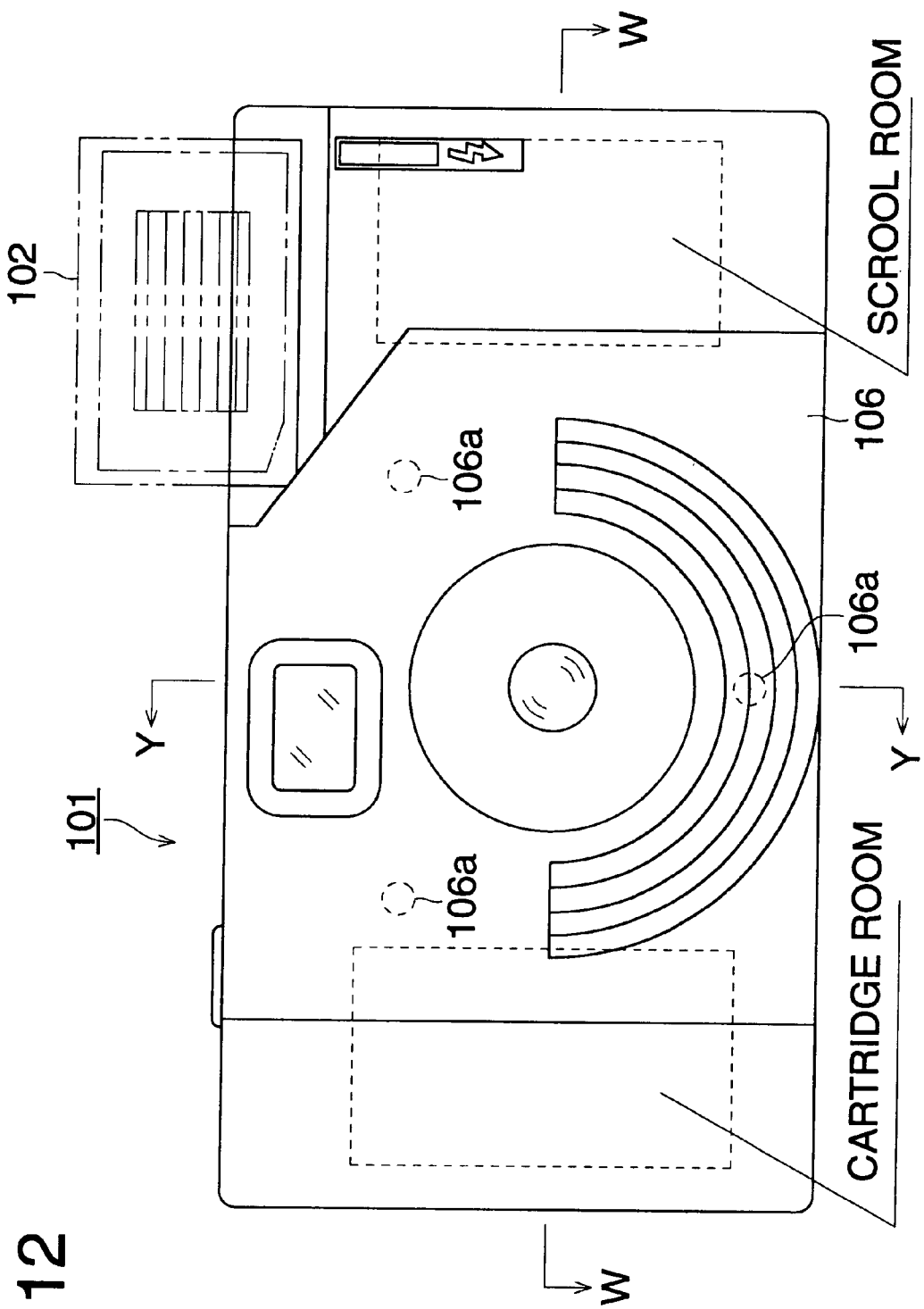
FIG. 12 is a front view showing the lens-fitted film unit according to the present invention.
Figure 13:
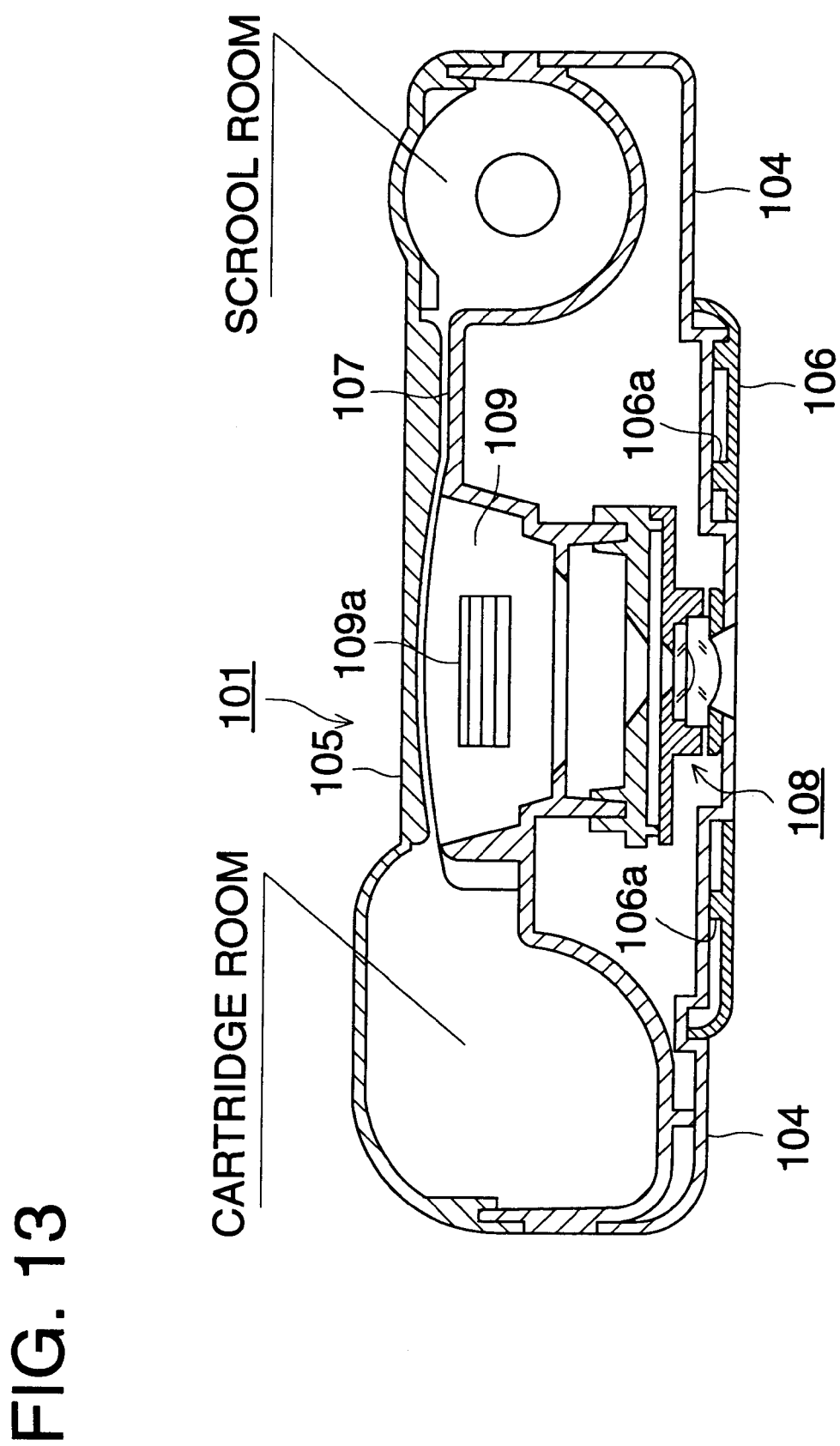
FIG. 13 is a cross sectional view observed along an arrow direction W in FIG. 12.
Figure 14:
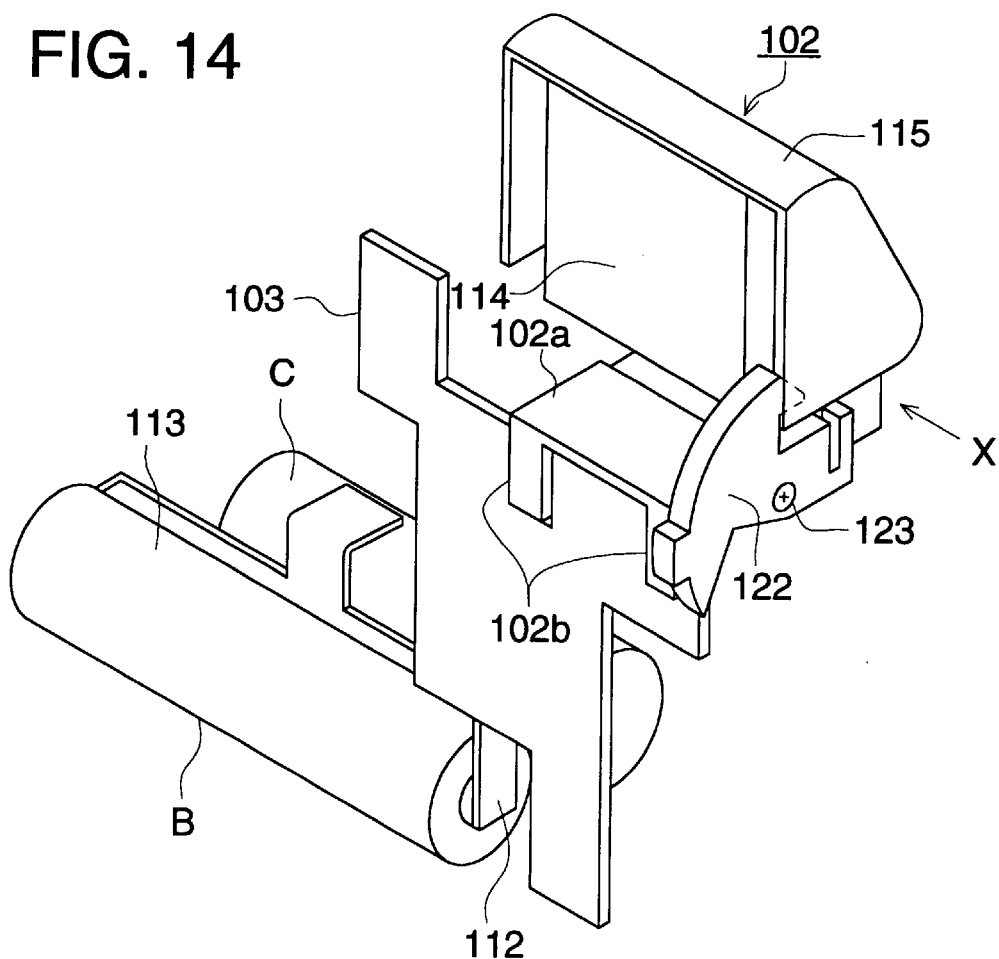
FIG. 14 is a perspective view showing a strobe unit in which a light emitting section is protruded.
Figure 15:
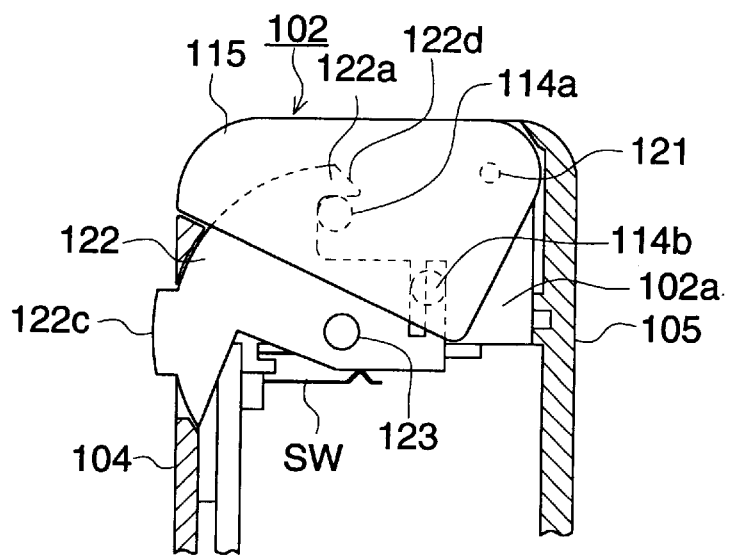
FIG. 15 is a sectional view in which the light emitting section indicated with X in FIG. 14 is housed.
Figure 16:
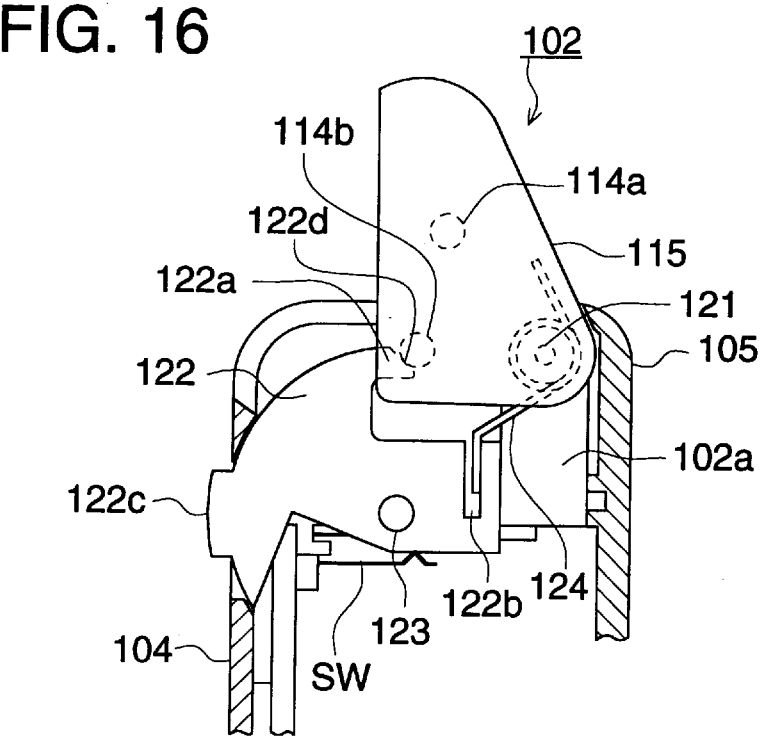
FIG. 16 is a sectional view in which the light emitting section indicated with X in FIG. 14 is protruded.
Figure 17:
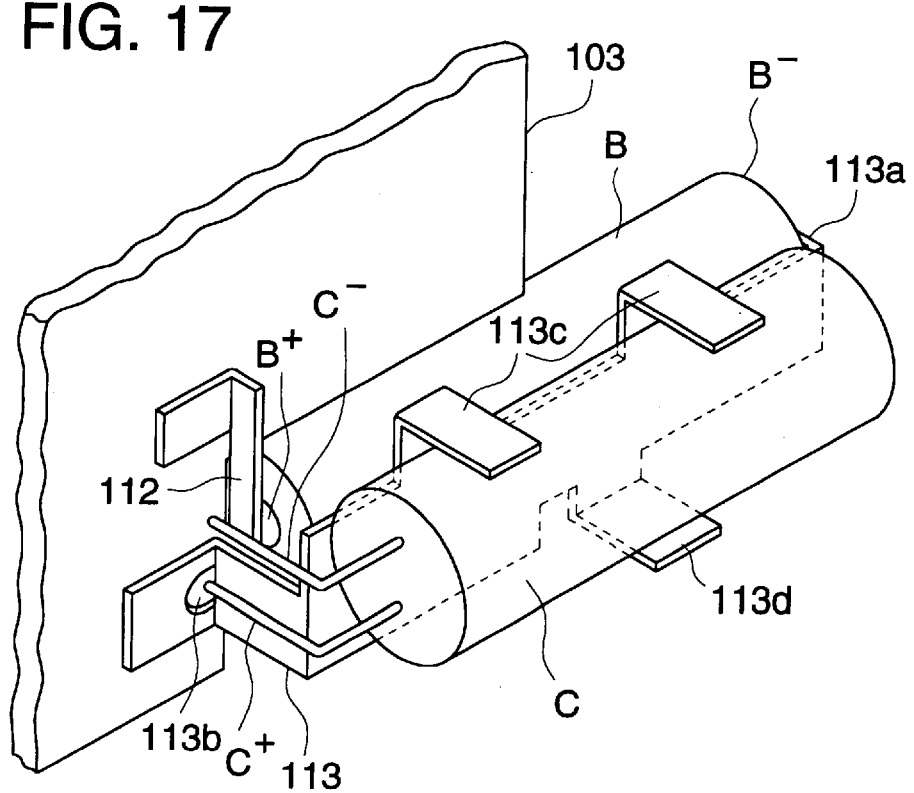
FIG. 17 is a perspective view in which a cylindrical battery and a main condenser for the strobe are arranged in parallel to each other.
Figure 18:
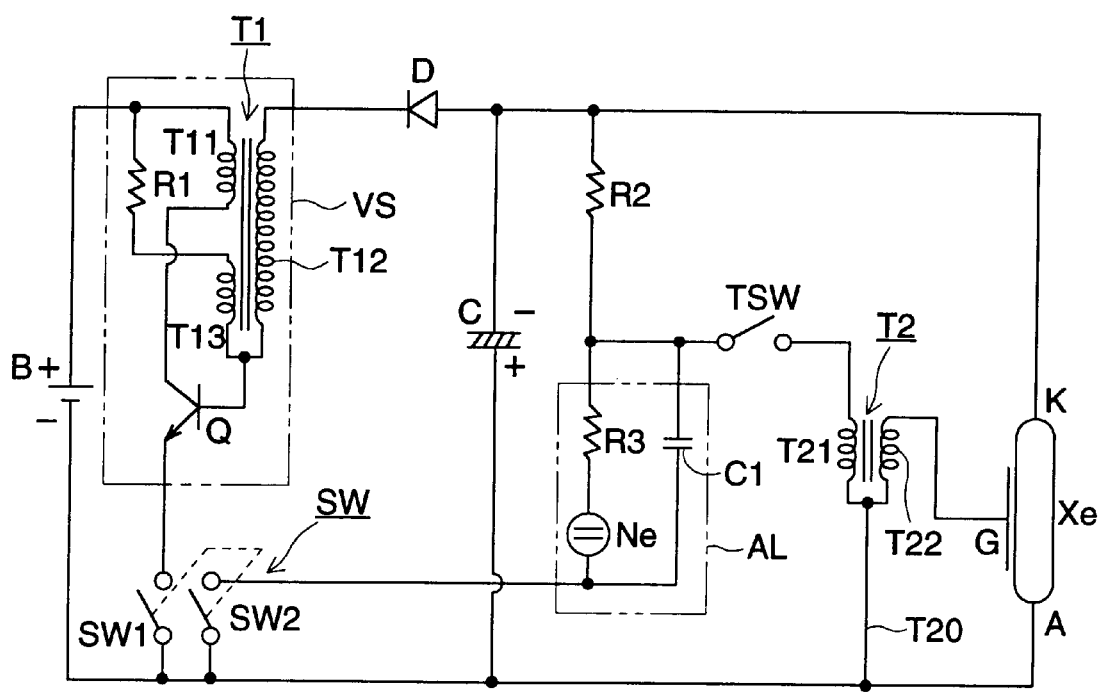
FIG. 18 is a diagram showing a strobe circuit.
Figure 19:
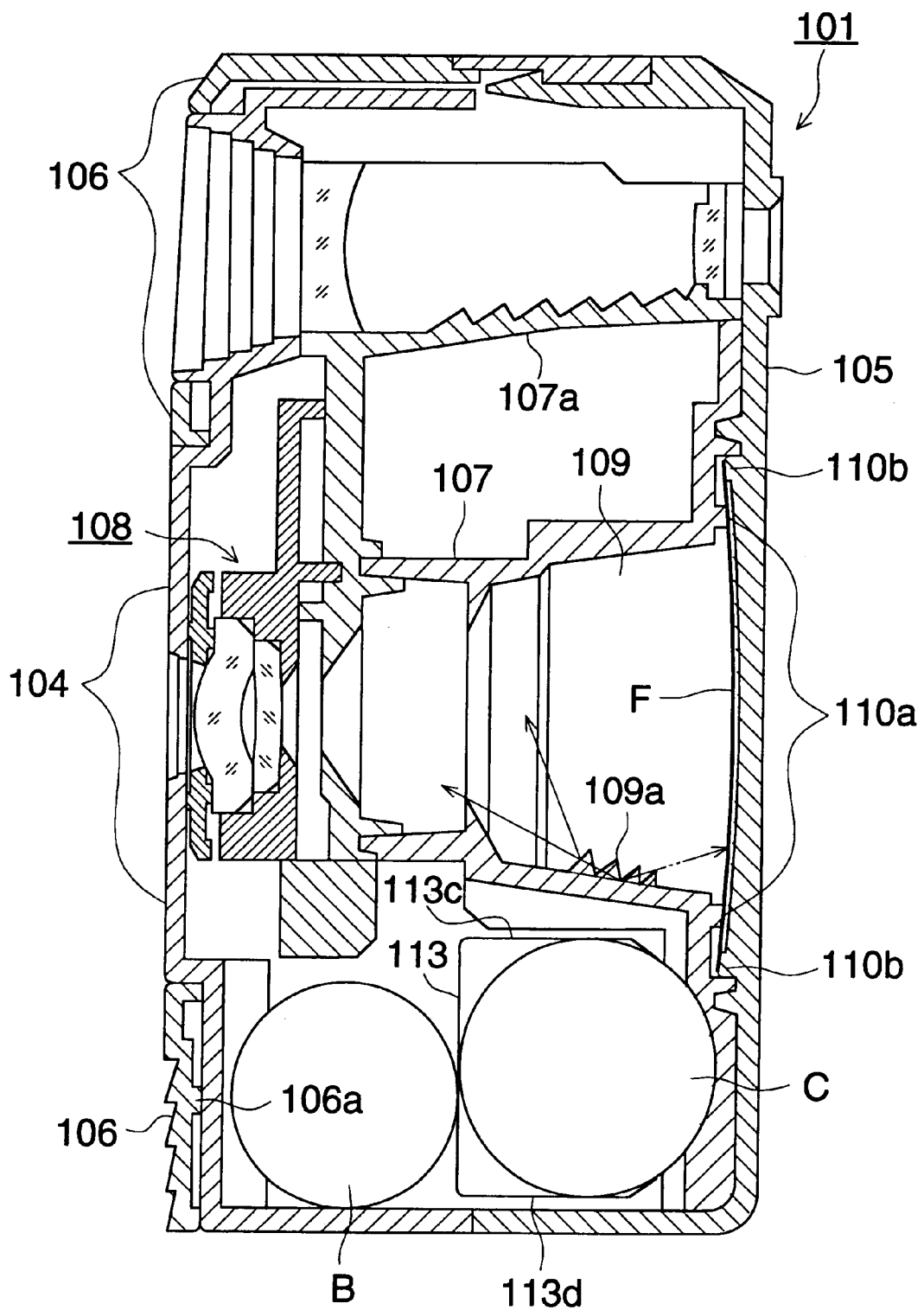
FIG. 19 is a enlarged cross sectional view observed along an arrow direction Y in FIG. 12.

FIG. 12 is a front view showing the lens-fitted film unit according to the present invention. FIG. 13 is a cross sectional view observed along an arrow direction W in FIG. 12. FIG. 14 is a perspective view showing a strobe unit in which a light emitting section is protruded. FIG. 15 is a sectional view in which the light emitting section indicated with X in FIG. 14 is housed. FIG. 16 is a sectional view in which the light emitting section indicated with X in FIG. 14 is protruded. FIG. 17 is a perspective view in which a cylindrical battery and a main condenser for the strobe are arranged in parallel to each other. FIG. 18 is a diagram showing a strobe circuit. FIG. 19 is a enlarged cross sectional view observed along an arrow direction Y in FIG. 12.

In FIGS. 12, 13 and 19, in the lens-fitted film unit 101 of the present invention, a lens barrel for holding at least a photographing lens is arranged between a cartridge room in which a film cartridge is housed and a scroll room in which unexposed film is rolled up in advance and stored. Further, above the scroll room is provided a light emitting section capable of changing its attitude for the case of photographing or for the case of non-photographing. Beneath the lens barrel, a cylindrical battery B for a strobe power source and a main condenser C for the strobe are arranged in parallel to each other.

Now, the entire configuration of the strobe unit in the lens-fitted film unit with reference to FIGS. 14, 15 and 16.

The light emitting section are equipped with a discharge tube and a reflecting hood in its inner side. The discharge tube is a glass tube in which xenon gas is charged. The xenon gas is ionized by a high electric voltage, thereby causing electric-discharge and light emission. The reflecting hood is made of an aluminum alloy plate and its internal surface is formed in a mirror surface. The reflecting hood reflects strobe light emitted from the discharge tube and regulates the reflected strobe light to have a light distribution characteristic corresponding to the view angle of a photographing lens. The discharge tube and the reflecting hood are retained by a retaining member. The front of the reflecting hood is covered with a strobe panel 114 made of a transparent or semitransparent material and the top, the sides and the back of the reflecting hood are covered with a light emitting section cover 115 made of an opaque material. A unit composed of the discharge tube, the reflecting hood, the retaining member, the strobe panel 114 and the light emitting section cover 115 is named a light emitting section 102.

Beneath the light emitting section 102 is provided a strobe base 102a used as the mounting base of the strobe unit. On the strobe base 102a is provided an unillustrated supporting section so as to stand on in the vicinity of side walls at the right and left of the retaining member. The retaining member is supported ratably by a supporting shaft 121. Accordingly, the entire construction of the light emitting section 102 is ratably held on the strobe base 102a by the supporting section and the supporting shaft 121.

Further, a switch lever 122 is supported rotatably on the strobe base 102a by the supporting shaft 123. As shown in FIGS. 15 and 16, an engaging section 122a is provided at the one end of the switch lever 122 in such a way that the engaging section 122a can be engaged with a pin 114a provided so as to stand on a side of the strobe panel 114. One end of a coil spring 124 is hooked to the retaining member and the other end of the coil spring 124 is fit into a groove 122b on the switch lever 122, thereby urging the light emitting section 102 together with the retaining member in the clockwise direction.

During the photography without the strobe, as shown in FIG. 15, on the condition that the front of the light emitting section 102, that is, the strobe panel 114 takes the attitude facing downward, the pin 114a is hooked by the hooking section 122a of the switch lever 122 so that the light emitting section 102 is housed in the lens-fitted film unit.

Incidentally, numeral 105 is a back cover as an outer casing member for hiding the internal photographing mechanism in cooperation with a front cover 104 and for keeping the film being sheltered from light.

Next, when a knob 122c of the switch lever 122 is pressed downward by a finger so as to be turned in counterclockwise in FIG. 15, since the engaging section 122a releases the stop pin 114a from being engaged, the light emitting section 102 is rotated clockwise by the urging force of the coil spring 124. Then, as shown in FIG. 16, the light emitting section 102 is protruded from the surface of the outer casing member composed of the front cover 104 and the back cover 105 and stops by coming in contact with a unillustrated stopper on the condition that the strobe panel 114 faces toward the subject to be photographed so that photographing can be conducted with the strobe. Further, if the knob 122c is released from the finger, the switch lever 122 is returned to the original position by the urging force of the coil spring 124. Still more, since the stopper pin 114b provided so as to stand on a side surface of the strobe panel 114 is pushed up by the slanted surface 122d of the switch lever 122, the light emitting section 102 is maintained stably on the upwardly protruded condition without vibrating forward or backward.

As stated above, the lens-fitted film unit 101 is made small when it is carried in a pocket. On the other hand, when photographing with the strobe, the light emitting section 102 is shifted to a position distant from the optical axis of the photographing lens more than that in the time of conducting photographing without the strobe as shown by the two-doted chain line in FIG. 12. As a result, red eye phenomenon can be reduced.

When the light emitting section is housed after the photographing with the strobe, the back of the light emitting section 102 is pushed by a hand so that the light emitting section 102 is rotated counterclockwise, whereby the stopper pin 114b pushes the slanted surface 122d of the switch lever and the pin 114a pushes the slanted surface 122d. Then, as shown in FIG. 15, the pin 114a is shifted beneath the engaging section 122a and is engaged with it so that the light emitting section 102 is put on the housed condition.

Numeral 103 is a circuit base board on which charging circuit components and light emitting circuit component necessary for charging the strobe and for emitting light are mounted although the components are not illustrated. The circuit base board is constructed integrally by an arm section 102b of the strobe base 102a.

Further, lead wires from an anode, a cathode and a trigger electrode of the discharge tube are connected to the circuit board 103.

Reference symbol C represents a main condenser which is also mounted on the circuit base board 103. Reference symbol B represents a cylindrical battery which is a consumable component not being on of parts of the strobe unit. In the time of inspection or in the time of assembling the lens-fitted film unit, the cylindrical battery B can be installed by a plus contacting piece and a minus contacting piece of battery contacting pieces.

Strobe switch SW is arranged behind the circuit base board 103 and is actuated so as to turn on or off by an arm section extended from the retaining member with the rotation of the light emitting section 102. Accordingly, when the light emitting section 102 is housed in the film unit, the strobe switch SW turns off so that the strobe is not electrically charged. On the other hand, when the light emitting section 102 is protruded from the film unit, the strobe switch SW turns on so as to start the charging. As can be seen from this construction, since it is very easy to know the operating condition of the strobe, the following problem can be avoided. A photographer forgets to turn the strobe switch off during the photographing without strobe, whereby the electric power of the battery is consumed uselessly. In particular, since the lens-fitted camera is constructed such that the user can not replace the battery with a spare one, the structure to prevent the photographer from forgetting to turn the strobe switch off provide the effect greatly.

Next, in the lens-fitted film unit 101 of the present invention shown in FIG. 17, two lead wires of main condenser C composed of the plus pole lead wire $C^+$ and the minus pole lead wire $C^-$ are soldered to the circuit base board 103 of a print base board. Among two pieces of battery contacting pieces to come in contact with the plus pole $B^+$ and the minus pole $B^-$ respectively, the plus pole side contacting piece 112 is soldered to the circuit base board 103. The minus pole side contacting piece 112 is also soldered to the circuit base board 103, however, it is arranged so as to hold the main condenser C.

That is, in FIGS. 17 and 19, the cylindrical battery B which is AAA battery and the strobe-use main condenser C are arranged in parallel to each other beneath the lens barrel 108 for holding the photographing lens and both are mounted on the circuit board 103 located at the front of the film unit. The plus pole $B^+$ of the cylindrical battery B is brought in pressure contact with the plus pole side contacting piece 112 soldered to the circuit base board 103. While the minus pole $B^-$ of the cylindrical battery B is brought in pressure contact with the end portion 103a of the minus pole side contacting piece 103 which is extended to the right side between the cylindrical battery B and the main condenser C.

On the extended minus pole side contacting piece 103 are provided a holding projections 103c ad 103d by which the main condenser c is held.

The plus pole lead wire $C^+$ passes through the center of the hole 103b pierced in the minus pole side contacting piece 103 and soldered to the circuit board 103. Also, the minus pole lead wire $C^-$ is soldered to the circuit base board 103.

Now, the strobe circuit is explained with reference to FIG. 18.

In FIG. 18, reference symbol B is a cylindrical battery which is connected to a voltage step-up circuit VS enclosed with the two doted line through a switch element SW1 of the strobe switch SW used as a main switch. The voltage step-up circuit Vs is composed of a transistor Q, an oscillating transformer T1 which comprises a primary winding T11, a secondary winding T12 and a tertiary winding T13 used as a feedback winding, and a resistor R1. Upon receipt of a DC current from the cylindrical battery B, the voltage step-up circuit Vs conducts oscillating so as to convert the DC current into the high voltage AC current.

The AC current supplied from the voltage set-up circuit VS is rectified by diodes D so as to charge the main condenser C. The minus pole (−) and the plus pole (+) of the main condenser are connected to a cathode pole terminal K and an anode pole terminal A of a xenon discharge tube Xe so as to supply the discharging current.

Further, a grid G of the xenon discharge tube Xe is connected to a lightning circuit which is connected between the minus pole and the plus pole of the main condenser through a resister R2, a trigger switch TSW and a trigger coil T2 comprising a primary winding T21 and a secondary winding T22. When the trigger switch TSW is closed in response to the shutter action, an instant current flows into the primary winding T21 of the trigger coil T2 through the resister R2. Based on it, in turn, a pulse-shaped voltage caused in the secondary winding T22 is applied onto the grid G of the xenon discharge tube Xe, whereby the xenon tube conducts emitting light.

To the lighting circuit is connected an alarming circuit AL to warn an error to forget to turn the switch off upon indication of charge completion. The alarming circuit AL is inserted between a switching element SW2 of the strobe switch SW and the relative connecting point between the resister R2 and the trigger switch TSW and comprises a serial circuit of a resister R3 and a neon tube Ne and a condenser C1 connected in parallel to the serial circuit. The alarming circuit AL is connected between the both terminals of the main condenser C through the resister R2 when the strobe switch SW is closed so that the neon tube is flickered so as to indicate the completion of the charging and to warn the error to forget to turn the strobe switch SW off.

Herein, the action of the strobe circuit is explained.

Firstly, when the strobe switch SW is closed, the voltage step-up circuit VS is connected to the battery B through the switch element SW1 of the strobe switch SW, whereby the voltage step-up circuit is actuated so as to output the high voltage AC current. The high voltage AC current is rectified to be a high voltage DC current and the main condenser is charged with the high voltage DC current. When a release button is pushed after the main condenser is sufficiently charged, the shutter is actuated so as to close the trigger switch TSW, whereby the grid G of the xenon discharge tube Xe is applied with a voltage. Then, the xenon discharge tube Xe emits light so that the photographing with the strobe is conducted.

Further, the electric charge charged in the main condenser C is supplied to the alarming circuit AL through the resisters R2 and R3 and the switch element SW2 of the strobe switch SW. In the alarming circuit Al, the condenser C1 is charged with an electric current supplied from the main condenser C. The charged voltage in the condenser C1 is applied to the serial circuit of the resister R3 and the neon tube Ne, and then the neon tube Ne starts discharging, that is, conducts the lighting. As the neon tube Ne conducts the lighting, the charged voltage of the condenser C1 is lowered. When the charged voltage of the condenser C1 is lowered to the preset voltage, the neon tube Ne stops the discharging and the lighting. Thereafter, the condenser C1 is charged again. When the charged voltage of the condenser C1 becomes high, the neon tube Ne conducts again the discharging and the lighting. With this manner, the neon tube Ne conducts the flickering. The flickering is used to indicate the completion of the charging and also used to warn the error to forget to turn the strobe switch off. That is, when the strobe switch SW is turned off after the photographing with the strobe, the action of the entire circuit including the alarming circuit AL is stopped so that the flickering is also stopped.

Since the minus pole (−) of the cylindrical battery B and the plus pole (+) of the main condenser C are connected to the ground at the same electrical potential, when the plus pole lead wire $C^+$ of the main condenser C is soldered to the circuit base board 103 as shown in FIG. 17, even if the solder is spread from the plus pole lead wire $C^+$ over the hole 113b to the minus pole side contacting piece 113 so that the plus pole of the main condenser C is conducted electrically with the minus pole B⁻ of the battery, no problem may be caused. Accordingly, when an appropriate space is provided so as not to bring the minus pole lead wire C⁻ of the main condenser C in contact with both the plus pole side contacting piece 112 and the minus pole side contacting piece 113, even if the plus pole lead wire C⁻ of the main condenser C is arranged close to the hole 113b of the minus pole side contacting piece 113, no problem may be caused.

In FIGS. 17 and 19, the main condenser C is held by projections 113c, 113d of the minus pole side contacting piece 113. The projections 113c, 113d are bent so as to form a ER-shaped section and the main condenser C is put between the bent projections 113c, 113d, whereby the position of the main condenser C is determined. With this construction, even if the strobe unit is hit on somewhere before it is set at the predetermined position in the lens-fitted film unit, a problem that the position of the main condenser C is shifted greatly can be avoided. Incidentally, as shown in FIG. 19, by further bending the tip end of the bent projections 113c, 113d slightly inwardly, the main condenser C can be held firmly. In the present invention, as discussed above, the cylindrical battery B and the main condenser C are arranged in parallel to each other and accommodated beneath the lens barrel 108 and the cylindrical battery B is located at the front of the lens-fitted film unit from the position of the condenser C. This construction allows the lens-fitted film unit of the present invention to be made more compact.

In the lens-fitted film unit 101 of the present invention shown in FIGS. 12, 13, and 19, a makeup plate 106 is provided at the front of the front cover 104 of the outer casing member having a hole through which an incident light passes to the photographing lens.

More specifically, protrusions of a small size are provided locally on the back of the makeup plate 106 having a relatively large area, and the protrusions are adhered with adhesive to the front cover 104 so that the makeup plate 104 is fixed at the front of the front cover 104. By replacing only this makeup plate with a new one, the other parts such as the front cover 104, the back cover 105, the main body section 107 comprising the cartridge room, scroll room and the photographing opening section, an unillustrated film winding mechanism, a finder section 107a comprising a finder optical system, the lens barrel 108 holding the photographing lens and the strobe unit, can be reused after the proper inspection, whereby the lens-fitted film unit of the present invention has the less number of thrown-away parts and can contribute to reduce environmental pollution. Further, by changing the design on the makeup plate, it can be easy to change the image of the lens-fitted film unit.

In the lens-fitted film unit shown in FIGS. 13 and 19, a photographing opening section 109 through which image light is focused on a film by the photographing lens is arranged between a cartridge room in which a film cartridge is stored and a scroll room in which an exposed roll film is wound up in advance and stored. A plurality of elongated protrusions 109a arranged in an orientation to cross the optical axis of the photographing lens are provided on at least one of inner walls of the photographing opening section 109a. As a preferable example, the plurality of elongated protrusions 109a are provided on the inner wall located at the bottom section of the photographing opening section 109a as shown in FIG. 19.

When bright light such as sun light comes from the arrow direction indicated with a solid line during photographing under light coming the reversed direction, if the plurality of elongated protrusions 109a are not provided, the bright light is reflected in the arrow direction indicated with the two-dotted chain line so as to cause flare on the film. By providing the plurality of elongated protrusions 109a to the inner wall located at the bottom section of the photographing opening section 109a, the sun light is reflected into the arrow direction indicated with the solid line so that the flare can be avoided.

When the plurality of elongated protrusions 109a are made of resin integrally with the wall by molding, a slide core is to be used from the view of construction of a mold. In the case that the slide core is used, in order to attain low cost by restricting the raise in the cost due to the complicate construction of the mold, it may be preferable to provide the plurality of elongated protrusions 109a to only the inner wall located at the bottom section of the photographing opening section 109a. Needless to say, by providing the plurality of elongated protrusions 109a to there, it may be enough to cope with the photographing under light coming the reversed direction.

In the lens-fitted film unit shown in FIGS. 13 and 19, a photographing opening section 109a through which image light is focused on a film by the photographing lens is arranged between a cartridge room in which a film cartridge is stored and a scroll room in which an exposed APS type roll film is wound up in advance and stored. Rails 110a of the first elongated projections arranged in parallel to the film feeding direction are provided at upper and lower portions of the opening section 109a, while rails 110b of the second elongated projections are provided at the outsides of the rails 110a in parallel to the rails 110a to the inner wall of the back cover 105 of the outer casing member opposite to the opening section 109a. The film F is put between the rails 110a and the rails 110b at the upper and lower portions of the opening section 109a and the film F is brought in contact with the rails 110a by the rails 110b.

As shown in FIG. 19, the film F is put between the upper rail 110a on the opening section 109a and the upper rail 110 on the back cover 110b and also put between the lower rail 110a and the lower rail 110b. Further, the film F is urged by the rails 110b toward the rails 110a. Accordingly, the film F is not moved or vibrated by such an impact force caused by releasing the shutter so that there in not fear that the unclear image is photographed on the film due to the movement or the vibration of the film. As a result, a clear image may be always photographed on the film.

According to the present invention, the size of the lens-fitted film unit can be made smaller. Even with the small size, red eye phenomenon can be reduced. An error to forger to turn the battery power source off can be avoided. The trouble on the main condenser in the strobe unit can be reduced. The inner wall to reduce the influence of the reflection on its inner surface under light coming from the reverse direction can be produced at the low cost. The clear image can be photographed on the film of the APS cartridge. The number of thrown-away parts can be reduced so as to contribute less environmental pollution. Further, the image of the lens-fitted lens unit can be easily changed.

What is claimed is:

1. A photographing device with a built-in strobe, comprising:
    a light emitting unit comprising:
        a light emitting tube which emits strobe light,
        a reflecting hood which reflects the strobe light,
        a strobe panel which covers a front of the reflecting hood and which transmits the strobe light therethrough, and a light emitting frame which holds at least the light emitting tube, the reflecting hood, and the strobe panel;

a circuit board on which electric parts for the light emitting unit are mounted and on which a main switch made of a metal plate for the light emitting unit is mounted;

a slide switch which slides alternatively to a first state wherein the light emitting unit is activated and to a second state wherein the light emitting unit is deactivated; and a unit main body in which a photographing member for conducting photographing is incorporated;

an urging member which urges the slide switch and has a dead point at a point between the first state and the second state;

wherein when the slide switch is positioned proximate the first state from the dead point, the slide switch is urged toward the first state by the urging member, and wherein when the slide switch is positioned at the first state, the main switch turns ON and the light emitting unit is activated, and when the slide switch is positioned at the second state, the main switch turns OFF and the light emitting unit is deactivated.

2. The photographing device with a built-in strobe as defined by claim 1, wherein the urging member is a tumbler spring.

3. The photographing device with a built-in strobe as defined by claim 1, further comprising:

a cartridge room for housing a cartridge;

a scroll room for winding up in advance and storing unexposed film; and a lens barrel, interposed between the cartridge room and the scroll room, which holds at least a photographing lens, wherein the light emitting unit is provided above the scroll room, and a cylindrical battery for a strobe power source and a strobe main condenser are arranged in parallel and located beneath the lens barrel in a direction perpendicular to the optical axis of the photographic lens.

4. The photographing device with a built-in strobe as defined by claim 1, wherein a front cover of the photographing device includes a makeup plate.

5. The photographing device with a built-in strobe as defined by claim 1, further comprising a photographing opening section, provided between a cartridge room and a scroll room, to expose image light on film through a photographing lens, wherein an inner circumferential wall of the photographing opening section is provided with a protruded section arranged so as to cross an optical axis of the photographing lens.

6. The photographing device with a built-in strobe as defined by claim 1, further comprising a photographing opening section having upper and lower sections, the photographing opening section being interposed between a cartridge room and a scroll room and exposing image light on film through a photographing lens, first elongated protrusions are arranged in parallel to a film feeding direction at the upper and lower sections on the photographing opening section and second elongated protrusions are arranged at an outside of the first elongated protrusions on an inner wall of a back cover located opposite to the photographing opening section, wherein film is interposed between the first elongated protrusions and the second elongated protrusions.

7. The photographing device with a built-in strobe described in claim 1, wherein the photographic device is a lens-fitted film unit in which an unexposed photographic film is loaded in advance.

* * * * *